United States Patent
Green et al.

(10) Patent No.: US 11,465,660 B2
(45) Date of Patent: Oct. 11, 2022

(54) APPARATUSES, SYSTEMS, METHODS, AND SOFTWARE FOR TRAIN CONTROL AND TRACKING USING MULTI SENSORS, SSD/QR SIGNS, AND/OR RF REFLECTORS

(71) Applicant: Thales Canada Inc., Toronto (CA)

(72) Inventors: Alon Green, Toronto (CA); Walter Kinio, Toronto (CA); Firth Whitwam, Toronto (CA)

(73) Assignee: THALES CANADA INC., Toronto (CA)

( * ) Notice: Subject to any disclaimer, the term of this patent is extended or adjusted under 35 U.S.C. 154(b) by 431 days.

(21) Appl. No.: 16/489,347

(22) PCT Filed: Feb. 28, 2018

(86) PCT No.: PCT/IB2018/051294
§ 371 (c)(1),
(2) Date: Aug. 27, 2019

(87) PCT Pub. No.: WO2018/158711
PCT Pub. Date: Sep. 7, 2018

(65) Prior Publication Data
US 2020/0070860 A1    Mar. 5, 2020

Related U.S. Application Data

(60) Provisional application No. 62/464,880, filed on Feb. 28, 2017.

(51) Int. Cl.
*B61L 25/02* (2006.01)
*B61L 27/70* (2022.01)
(Continued)

(52) U.S. Cl.
CPC .......... *B61L 25/025* (2013.01); *B61L 25/021* (2013.01); *B61L 27/70* (2022.01); *G01S 13/75* (2013.01); *G01S 13/865* (2013.01); *G01S 13/867* (2013.01)

(58) Field of Classification Search
CPC .... B61L 3/125; B61L 15/0054; B61L 23/041; B61L 25/021; B61L 25/025;
(Continued)

(56) References Cited

U.S. PATENT DOCUMENTS 5,353,413 A * 10/1994 Novakovich ....... B61L 15/0036
701/117
5,893,043 A * 4/1999 Moehlenbrink ...... B61L 25/021
701/446

(Continued)

FOREIGN PATENT DOCUMENTS

EP    2752353 A1    7/2014
EP    3275764 A1    1/2018
(Continued)

OTHER PUBLICATIONS

European Search Report issued in corresponding European Patent Application No. 18761588, dated Apr. 3, 2020, pp. 1-15, European Patent Office, Munich, Germany.
(Continued)

*Primary Examiner* — Zachary L Kuhfuss
(74) *Attorney, Agent, or Firm* — Hauptman Ham, LLP

(57) ABSTRACT

Apparatuses, systems, methods, and software for train control and tracking using multi sensors, SSD/QR signs, and/or RF reflectors are disclosed, which enable determination of train location on a guideway, train movement authority, train length, and coupler status of each vehicle (married pair) and the consist (integrity) of the train.

20 Claims, 18 Drawing Sheets

(51) Int. Cl.
*G01S 13/75* (2006.01)
*G01S 13/86* (2006.01)

(58) Field of Classification Search
CPC .... B61L 27/0005; G01S 13/75; G01S 13/865; G01S 13/867
See application file for complete search history.

(56) References Cited

U.S. PATENT DOCUMENTS

| | | | |
|---|---|---|---|
| 5,966,084 A * | 10/1999 | Lumbis | B61L 15/0036 340/933 |
| 6,049,296 A * | 4/2000 | Lumbis | B61L 15/0072 340/933 |
| 6,511,023 B2 | 1/2003 | Harland | |
| 6,666,411 B1 | 12/2003 | Hart et al. | |
| 7,826,938 B2 | 11/2010 | Kato et al. | |
| 8,214,091 B2 | 7/2012 | Kernwein | |
| 8,478,462 B2 | 7/2013 | Brady et al. | |
| 8,712,610 B2 | 4/2014 | Kumar | |
| 8,712,612 B2 | 4/2014 | Beaurent et al. | |
| 9,174,657 B2 | 11/2015 | Morris | |
| 9,381,927 B2 | 7/2016 | Dimmer et al. | |
| 9,390,385 B2 | 7/2016 | Kanner et al. | |
| 9,499,185 B2 | 11/2016 | Green et al. | |
| 9,663,128 B2 | 5/2017 | Johnson et al. | |
| 2005/0205719 A1 | 9/2005 | Hendrickson et al. | |
| 2010/0258682 A1 | 10/2010 | Fries et al. | |
| 2012/0130562 A1 | 5/2012 | Brand et al. | |
| 2014/0277859 A1 * | 9/2014 | Morris | B61L 25/02 701/19 |
| 2015/0239482 A1 * | 8/2015 | Green | B61L 23/041 246/122 R |
| 2016/0009303 A1 | 1/2016 | Spahis et al. | |
| 2017/0043797 A1 | 2/2017 | Allshouse et al. | |

FOREIGN PATENT DOCUMENTS

| | | |
|---|---|---|
| RU | 2499714 C2 | 11/2013 |
| RU | 2559869 C1 | 8/2015 |
| WO | 2007091072 A1 | 8/2007 |
| WO | 2015092558 A1 | 6/2015 |

OTHER PUBLICATIONS

Gupta, A.K, et al., "Railway Track Finding System with RFID Application," International Journal of Computer Applications, vol. 83, No. 7, Dec. 2013, pp. 24-30.

Santos, A.J.D., et al., "Tracking trains via radio frequency systems," IEEE Transactions on Intelligent Transportation Systems, vol. 6, No. 2, Jun. 2005, pp. 244-258.

Zhang, X., et al., "Applications of Fast-Moving RFID Tags in High-speed Railway Systems," International Journal of Engineering Business Management, vol. 3, No. 1, 2011, pp. 27-31.

International Search Report from corresponding International Application No. PCT/IB2018/051294, dated Jun. 6, 2018, pp. 1-3, Canadian Intellectual Property Office, Gatineau, Quebec, Canada.

* cited by examiner

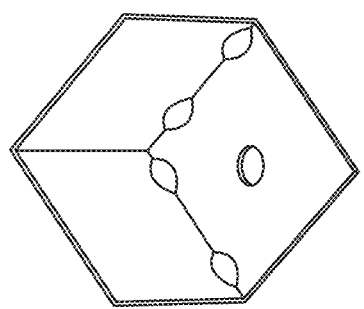
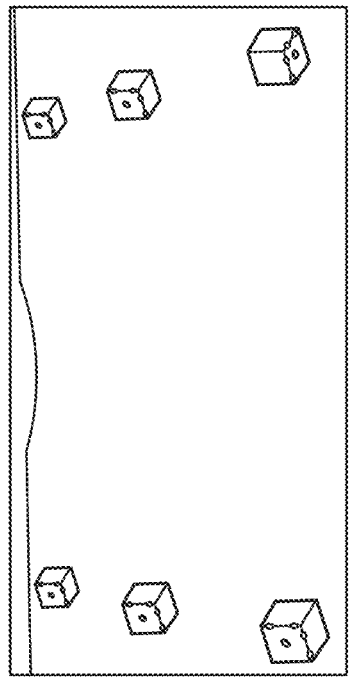
Figure 3: Corner Reflector Example.
FIG. 3

APPARATUSES, SYSTEMS, METHODS, AND SOFTWARE FOR TRAIN CONTROL AND TRACKING USING MULTI SENSORS, SSD/QR SIGNS, AND/OR RF REFLECTORS

BACKGROUND

A number of systems exist for guideway mounted vehicle localization. Some of these systems include vehicle location determination by an on-board system, movement authority determination by an on-board system, couplers status and vehicle length determination by an on-board system, and vehicle tracking by a wayside system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a corner reflector example in accordance with some embodiments.

DETAILED DESCRIPTION

Figure 1:
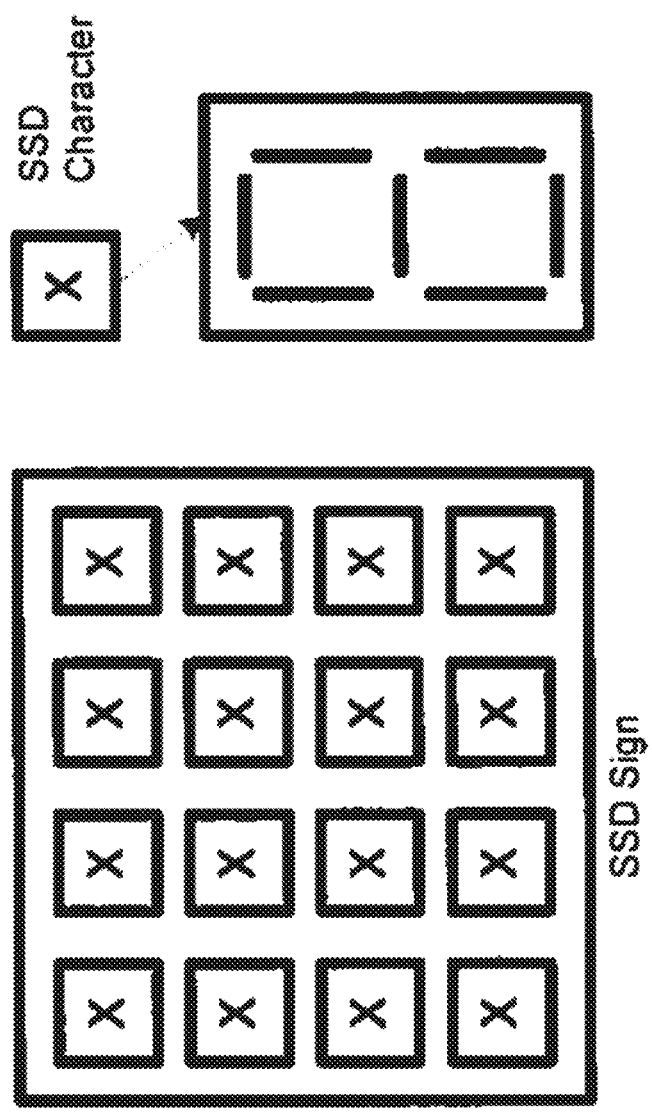
FIG. 1 is an SSD sign example in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with at least one embodiment, the present disclosure provides a system that enables on-board and wayside based functionality with respect to a particular guideway mounted vehicle. On-board functionality includes the ability to perform on-board location determination based on observations analyzed by a vehicle on-board controller (VOBC), the ability to request and communicate based on the vehicle sign and switch and route related requests in a vehicle transceiver, and the ability to determine vehicle coupling status and length determination. Wayside functionality includes the ability to determine a vehicle location on the guideway based on observations analyzed by a wayside controller and the ability to request and communicate switch and route related information on a guideway adjacent transceiver.

In accordance with an embodiment, the vehicle includes a sensor on each end extending along a guideway of the vehicle, i.e., a first end has a sensor and an opposite second end has a sensor. Each sensor is oriented to detect an SSD/QR sign and/or reflector/transceiver positioned along the guideway and read the sign and/or reflector/transceiver. The sensor communicates the information read from the SSD/QR sign and/or reflector/transceiver to the VOBC. The information includes an ID uniquely identifying the sign and corresponding to a sign ID stored in a memory of the VOBC. The VOBC memory includes the sign ID and a known location of the sign. The information also includes one or more variable pieces of information related to the vehicle and/or the vehicle movement on the guideway. Such additional information is usable as described below regarding detection of signs and/or reflectors/transceivers installed on the trackside.

The SSD/QR sign and/or reflector/transceiver is communicatively coupled with and controlled by a Wayside Controller to display at least the sign ID in a static portion. The Wayside Controller also controls the sign to display one or more of the variable pieces of information in a dynamic portion. For example, the sign is controllable to display switch attributes, authorized speed for the guideway section, and/or a connected path of a next section of the guideway toward which the vehicle is traveling. The static portion of the sign display indicates that the information does not change as opposed to the dynamic portion of the sign display indicates that the information is changeable or may vary over time.

In accordance with another embodiment, the vehicle includes a sensor on each end extending along a guideway of the vehicle, i.e., a first end has a sensor and an opposite second end has a sensor. Each sensor is oriented to detect an SSD/QR sign and/or reflector/transceiver attached to another vehicle and read the sign and/or reflector/transceiver. The sensor communicates the information read from the SSD/QR sign and/or reflector/transceiver to the VOBC. The information includes a vehicle (train) ID uniquely identifying the vehicle and corresponding to a vehicle ID stored in a memory of the VOBC. The VOBC memory includes the vehicle ID and a known location of the vehicle. The information also includes one or more variable pieces of information related to the vehicle and/or the vehicle movement on the guideway. Such additional information is usable as described below regarding detection of signs and/or reflectors/transceivers installed on the vehicle.

The SSD/QR sign and/or reflector/transceiver is communicatively coupled with and controlled by another VOBC to display at least the vehicle ID in a static portion. The VOBC also controls the sign to display one or more of the variable pieces of information in a dynamic portion. For example, the sign is controllable to display the speed at which the vehicle on which it is mounted is traveling. The static portion of the sign display indicates that the information does not change as opposed to the dynamic portion of the sign display indicates that the information is changeable or may vary over time.

In some embodiments, the vehicle includes two sensors on each end extending along a guideway of the vehicle, i.e., a first end has two sensors and an opposite second end has two sensors. Each end has at least one sensor for detecting SSD/QR sign and/or reflector/transceiver positioned along the guideway and at least one sensor for detecting SSD/QR sign and/or reflector/transceiver attached to another vehicle for enabling performance of the described functionalities.

In accordance with another embodiment, one or more sensors similar to those above are installed at predetermined trackside locations and oriented toward SSD/QR signs and/or reflector/transceivers installed on the vehicle. In some embodiments, the vehicle includes one or more SSD/QR sign and/or reflector/transceiver attached to one or more sides of the vehicle, e.g., front, back, side, and similar. In operation, the one or more sensors installed at trackside locations read the sign as described above and transmit the information to one or more Wayside Controllers or centralized controller, in some embodiments. Using the trackside location sensors, the Wayside Controller is able to determine information as described below with respect to wayside portion, e.g., vehicle location relative to the sensor; vehicle speed relative to the sensor; vehicle speed as determined and caused to be displayed by the VOBC on the vehicle; a request to reserve, lock, and/or move a specific switch; and/or information related to the connected path that the vehicle is requesting to proceed along.

Other approaches to on-board vehicle location determination systems used inductive loop crossovers or RFID transponders installed at predefined trackside (or guideway) locations. When the corresponding on-board reader detects the inductive loop crossover or the RFID transponder, the train location is determined to be the location of the inductive loop crossover or the RFID transponder on the guideway. The train employs "dead reckoning" between transponder locations. The train position is relocalized upon the detection of a new inductive loop crossover or RFID transponder.

Inductive loop crossover detection accuracy is +/−10 cm. However, it is very sensitive to interference resulting either in misreads or phantom/ghost reads. Also, inductive loops crossovers do not contain a unique ID for absolute location determination they are only used for relative location within the loop as they are installed every 25 m. Inductive loops installation is relatively expensive as copper wires have to be laid along the trackside with crossovers every 25 m.

Typically, RFID transponder detection accuracy is not as good as the inductive loops crossovers (e.g. in some cases up to +/−1 m). The advantage of RFID transponders is that a unique ID is encoded within the transponder which is translated via the on-board database into an absolute location determination. RFID based systems do however require installation activities both on the train and to put the necessary infrastructure in place. RFID systems are impacted by other conductive surfaces and for some systems, trackside installation and train antenna positioning can be quite difficult.

Typically, the movement authority is determined by a centralized or distributed wayside system that collects the location and direction of travel of each train within its territory and determines the movement authority for each train ensuring safe separation between trains and switch reservation/locking according to the train's requested path.

The movement authority is transmitted to the train either via the inductive loops or via radio communication established between the radio on-board the train and access points (APs) installed along the trackside.

Both inductive loop and radio based communication can suffer from interference and may result in significant delays in the transmission of information between the wayside system and the on-board system and vice versa.

Typically, each coupler status is determined by relay driven circuit at each end. If two ends are electrically connected (coupled) the signal will be high. However, if the end is not electrically connected (uncoupled) the signal will be low. The length of the train is determined by the on-board system by calculating the number of married pairs in the train times the length of each married pair.

The number of married pairs in the train is determined by the on-board system to the number of coupled and uncoupled ends divided by 2. Plausibility rules should be satisfied such as: (1) the number of uncoupled ends should be exactly 2; and/or (2) the number of coupled ends should be an even number.

Coupler status requires a cable connecting both ends. The number of signals going through the cable's umbilical connector is very limited and may require repeaters to relay the signals over long distance to the on-board system that may be installed at the other end of the train.

Typically, trains are tracked by the wayside system by:
(1) The on-board system transmitting the train location, direction of travel and speed information to the wayside system via radio communication or inductive loops.
(2) The wayside system detects the train location and direction of travel based on track circuits occupancies sequence or evaluation the axle/wheel in and axle/wheel out counts for each track element.

Track circuits and axle/wheel counting evaluation devices are relatively expensive to install on the trackside. Also, the information related to the train that can be collected by the wayside system is very limited. Typically occupancies sequence and in some cases the train speed may be determined too. Both track circuit and axle/wheel counting systems add additional electronics to the overall system and reduce overall reliability. The train intended path, next stop or other information cannot be collected by these systems.

A number of problems are extant in existing systems, such as train location determination by an on-board system, movement authority determination by an on-board system, couplers status and train length determination by an on-board system, and train tracking by a wayside system. A brief summary of limitations of each of these technologies is presented below. Among the drawbacks of existing technology are:

For location, using inductive loops or transponders on the trackside with the associated readers on-board the train which requires complex trackside and train installation effort.

For movement authority, using on-board and trackside radios.

For train length and coupling status, routing electric wires along the train which is complex to install.

The inductive loop, transponders, on-board and trackside radios do not solve the following problems:

High life cycle cost due to the harsh environment in which the transponder interrogator and the loop read antennas are typically installed within the train.

High life cycle cost due to installation and maintenance of inductive loops, transponders and radios on the trackside.

Limited bandwidth for delivering data across different married pairs due to the limited number of wires that can go through the umbilical connector.

On-Board System Problems (1) Train location determination. Most on-board existing technologies use inductive loops with crossovers or transponder RFID installed on the trackside with the corresponding reader or readers installed on-board the train to determine the train location on the guideway. Solutions based on inductive loops crossovers require a complex guideway installation scheme. It is very sensitive to interference and therefore prone to errors in determining the absolute location of the train on the guideway as the loops crossovers are lacking a unique identification. Solutions based on RFID transponders and the corresponding on-board reader are sensitive to interference and are prone to fail as a result of an adverse weather conditions such as rain or ice. The precision of the location determination is limited by the footprint of the RFID. This can result in more complex algorithms to compensate for this positional uncertainty. RFID detection can also be impacted by installation and environmental conditions such that reads can occur cross track or displaced from the actual RFID location. This also requires more complex algorithms to compensate. In systems using transponders the train location on the guideway may be determined to the database guideway location of the detected transponder ID. In systems using inductive loops the train location on the guideway may be determined to the database guideway location of the loop boundary when a transition from one loop to the other occurs. Within the loop the location is adjusted based on detection of loop crossovers occurring every 25 m (with a certain predefined tolerance). The train movement authority is typically provided to the train by the Zone Controller. The Zone Controller typically determines the movement authority based on:

The route requested for the train by central control.

The train location on the guideway as reported by the train or determined by the Zone Controller based on track occupancy.

Other trains movement authority.

Switches reservation, lock and position status.

Track occupancy status.

Track restrictions such as closed tracks.

(2) Coupler status and train length determination. Most on-board existing technologies uses relay based circuits to determine the coupler status (coupled/uncoupled) at each end of each married pair to determine the train length. The train length is typically determined to the number of married pairs that their coupler status at both ends is determined to the coupled state plus the two married pairs that are only coupled at one end. This solution uses train lines, which could otherwise be freed for other purposes. Solutions based on relay circuits have limited bandwidth as the number of signals going through the umbilical cable connecting two married pairs is very limited. These solutions rely upon relays and mechanical couplers which can limit the reliability of the solution. The coupler status of each end of each married pair may be determined by the Vehicle On Board Controller by monitoring a discrete signal which its state is determined to: (a) high if it is electrically connected to another married pair; (b) low if it is not electrically connected to another married pair. The length of the train may be determined by the Vehicle On-Board Controller by monitoring all couplers statuses on the train and determining how many married pair in the train consist. The number of married pairs in the train times the length of the married pair may determine the train length. Routing electric wires along the train requires complex installation and has very limited bandwidth as the number of wired is very limited.

Wayside System Problems

Most wayside existing technologies uses track circuits monitoring the track elements occupancy or axle/wheel counting evaluation devices installed on the wayside to determine the train location on the guideway based on the sequence of track elements occupancies. Solutions based on track circuits or axle/wheel counting evaluation devices requires complex installation scheme and have very limited capacity to transmit information regarding the train to the wayside. Typically just occupancy status. In some cases speed information may be derived too.

On-Board to Wayside Systems and Vice Versa Transmission Problem

Transmission of information between the on-board system to the wayside system and vice versa is typically based on inductive loops or RF communications either continuously or at discrete predetermined locations. Solutions based on RF communications are sensitive to interference, changes in the signal to noise ratio and may result in significant delay in the transmission layer. Each of these systems is difficult to install and maintain.

One or more embodiments of the present disclosed subject matter is Communication Based Train Control systems. In accordance with the present disclosure, the CBTC includes one or more of an on-board portion and/or a wayside portion.

On-Board Portion

In some embodiments, a solution to the aforementioned problems may be implemented using radar, LIDAR, camera and/or IR based sensors installed at each end of a train. Each end of the train may contain two sets of on-board sensors. In at least one embodiment, the sensors are a first sensor 110 or a second sensor 120 described in detail below with reference to FIG. 10. In at least one embodiment, the sensors are a fusion sensor such as fusion sensor arrangement 210a or 210b described in detail below with reference to FIG. 11. One set of sensors is intended to detect signs and/or RF reflectors/transceivers installed on the trackside while the other set of sensors is intended to detect signs and/or RF reflectors/transceivers installed on other trains. In some embodiments, a single sensor is arranged at each end of the train to detect signs and/or RF reflectors/transceivers installed on the trackside and on other trains. In some embodiments, a single sensor at each end of the train is usable in non-safety-critical applications, e.g., train alignment at platforms or redundant communication paths. The sensors are communicatively coupled with the Vehicle On-Board Controller (VOBC) (described in detail below) on-board the vehicle.

Detections of Signs and/or Reflectors/Transceivers Installed on the Trackside:

The first set of on-board sensors are oriented towards SSD/QR (seven-segment display or quick response) signs (although other types of displays or signs may be used) and/or RF reflectors/transceivers installed on the trackside. In some embodiments, the SSD/QR signs contain characters and/or pattern elements and the RF reflectors/transceivers contain encoded data which enable the Vehicle On-Board Controller to determine:

The train location relative to the sign and/or RF reflector/transceiver.

The train speed relative to the sign and/or RF reflector/transceiver.

The switch or switches ID, position, reservation and lock status.

Authorized speed limit.

Information related to the connected path that the train is authorized to proceed along.

In some embodiments, the sign location on the guideway is determined by the sign unique ID which is a subset of the sign's characters/pattern elements. The RF reflector/transceiver location on the guideway is determined by the unique ID encoded within the reflector/transceiver. In case of an RF reflector, the unique ID is determined by a unique signal strength pattern in the space domain. The train's relative location to the sign and/or reflector/transceiver is determined based on the distance between the sensors and the sign and/or the reflector/transceiver and the associated ID. If the train approaches the sign and/or the reflector/transceiver from guideway direction 1, the observed ID should correspond to that direction. However, if the train approaches the sign and/or the reflector/transceiver from guideway direction 2 (direction 2 being different from direction 1) then a different ID which corresponds to this direction will be observed.

In some embodiments, the VOBC has a non-volatile memory space on which the specific wayside sign and/or the reflector/transceiver IDs that may be detected by the sensors and/or their absolute location (chainage) in the system are stored. The VOBC stores in memory the wayside sign and/or reflector/transceiver IDs to be detected by the sensors along with a location of the sign and/or ID. In at least some embodiments, the location is stored as a distance along a given guideway. In some embodiments, the location is stored in global positioning system (GPS) based coordinates. In some embodiments, the location is stored in latitude, longitude, and elevation coordinates.

The train's relative speed to the sign and/or the reflector/transceiver is determined based on the rate the distance to the sign and/or the reflector/transceiver changes in the time domain. The switch related attributes, authorized speed and connected path are determined by the dynamic portion of the sign's characters/pattern elements other than the sign ID or by the transceiver's dynamic memory. In some embodiments, the Wayside controller controls the dynamic portion of the sign's characters/pattern elements and/or the dynamic portion of the transceiver's memory according to the actual switch attributes and the authorized speed and connected path.

Figure 2:
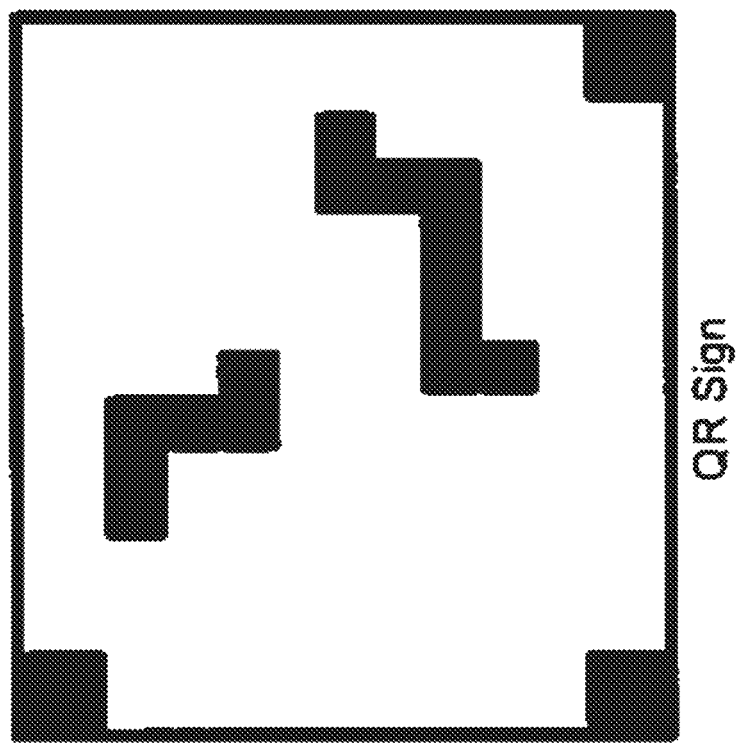
FIG. 2 is a QR sign example in accordance with some embodiments.

Examples of SSD/QR signs with characters/patterns are depicted in FIG. 1 and FIG. 2. Examples of corner reflector and corner reflector arrays are depicted at FIG. 3. The sensors are oriented in such a way that the signs and/or the reflector/transceiver are properly detected.

The following parameters are considered to ensure proper detection (refer to FIG. 4 and FIG. 5):

Train speed.

Processing time and delays.

The sensors field of view.

The sensors resolution.

Environmental conditions.

The sign and/or the reflector/transceiver size.

The sign and/or the reflector/transceiver relative position and orientation with respect to the sensors.

The size of each character/pattern element on the sign.

The separation distance between character/pattern element on the sign.

Detection of signs and/or reflectors/transceivers installed on other trains: A second set of on-board sensors are oriented horizontally forward looking toward SSD/QR signs and/or reflectors/transceivers installed on trains' front and rear faces. The SSD/QR signs contain characters and or pattern elements and the RF reflectors/transceivers contain encoded data which enable the Vehicle On Board Controller to determine:

The sensor distance from the sign and/or reflector/transceiver.

The relative speed between the sensor and the sign and/or reflector/transceiver.

The speed of the train on which the sign and/or reflector/transceiver is installed on.

The sign and/or reflector/transceiver location on the train is determined in such a way that a sensor installed on another train is able to detect the sign and/or reflector/transceiver. The sign's characters/pattern elements contain the train ID (static portion) and/or the speed at which the train is moving (dynamic portion). The reflector/transceiver encoded data may contain the train ID (static portion) and/or the speed the train is moving (dynamic portion). In some embodiments, the Vehicle On-Board Controller has a non-volatile memory space on which is stored the IDs of all the trains in the system. In at least some embodiments, the VOBC stores in memory the IDs of a subset of all the trains in the system. In at least some embodiments, the VOBC stores in memory the IDs of all the trains on a particular guideway in the system. In at least some embodiments, the sign displays both the static and dynamic portion of information at the same time. The static portion remains unchanged, e.g., corresponding to the train ID, while the dynamic portion changes based on the underlying data, e.g., speed of the particular train.

The Vehicle On-Board Controller controlling the train with the sign and/or reflector/transceiver ensures that the speed displayed on the dynamic portion of the sign's characters/pattern elements and/or encoded within reflector/transceiver reflects the actual train speed. The sensors are oriented in such a way that signs and/or reflectors/transceivers are properly detected.

The following parameters are considered to ensure proper detection (refer to FIG. 4 and FIG. 5):

Train speed.

Processing time and delays.

The sensors field of view.
The sensors resolution.
Environmental conditions.
The sign and/or reflector/transceiver size.
The sign and/or reflector/transceiver relative position and orientation with respect to the sensors.
The size of each character/pattern element on the sign.
The separation distance between character/pattern elements.

Wayside Portion

In some embodiments, aspects of the present disclosure may be implemented using radar, LIDAR, camera and/or IR based sensors installed at predetermined trackside locations such as platforms and/or switch zones. In at least one embodiment, the sensors are a first sensor 110 or a second sensor 120 described in detail below with reference to FIG. 10. In at least one embodiment, the sensors are a fusion sensor such as fusion sensor arrangement 210a or 210b described in detail below with reference to FIG. 11. The wayside sensors are oriented toward SSD/QR signs and/or reflectors/transceivers installed on the train's front, rear and/or side faces. The SSD/QR signs installed on the train contain characters and/or pattern elements and the reflectors/transceivers contain encoded data which enable the Wayside Controller to determine:

The train location relative to the sensor.
The train speed relative to the sensor.
The train speed as determined by the Vehicle On-Board Controller.
The request to reserve, lock and/or move a specific switch.
Information related to the connected path that the train is interested to proceed along.

The train identification is able to be determined by the sign ID which may be a subset of the sign's characters/pattern elements and/or the ID within reflector/transceiver encoded data. The train's relative location to the sensor is determined based on the distance between the sensors and the on-board sign and/or reflector/transceiver. In some embodiments, the Wayside Controller has a non-volatile memory space on which is stored the specific train IDs that will be detected by the sensors. In at least some embodiments, the Wayside Controller stores in memory the IDs of a subset of all the trains in the system. In at least some embodiments, the Wayside Controller stores in memory the IDs of all the trains on a particular guideway in the system.

The train's relative speed to the sensor is determined based on the rate the distance to the train's sign and/or reflector/transceiver is changing in the time domain. The train's speed as determined by the Vehicle On-Board Controller, the switch related requests and the requests related to the connected path are determined by the dynamic portion of the sign's characters/pattern elements and/or the reflector/transceiver encoded data other than the train's ID. The Vehicle On-Board Controller ensures that the dynamic portion of the sign's characters/pattern elements and/or the reflector/transceiver encoded data reflects the actual train speed and the need to reserve/lock/move switches within the connected path the train is expected to consume.

Examples of SSD/QR signs with characters/patterns are depicted at FIG. 1 and FIG. 2. Examples of corner reflector and corner reflectors array are depicted at FIG. 3. The sensors are oriented in such a way that the train's signs and/or the reflectors/transceivers are properly detected.

The following parameters are considered to ensure proper sign detection (refer to FIG. 6 and FIG. 7):

Train speed.
Processing time and delays.
The sensors field of view.
The sensors resolution.
Environmental conditions.
The sign and/or reflector/transceiver size.
The sign and/or reflector/transceiver relative position and orientation with respect to the sensors.
The size of each character/pattern element on the sign.
The separation distance between character/pattern elements.

On-Board Portion

Figure 4:
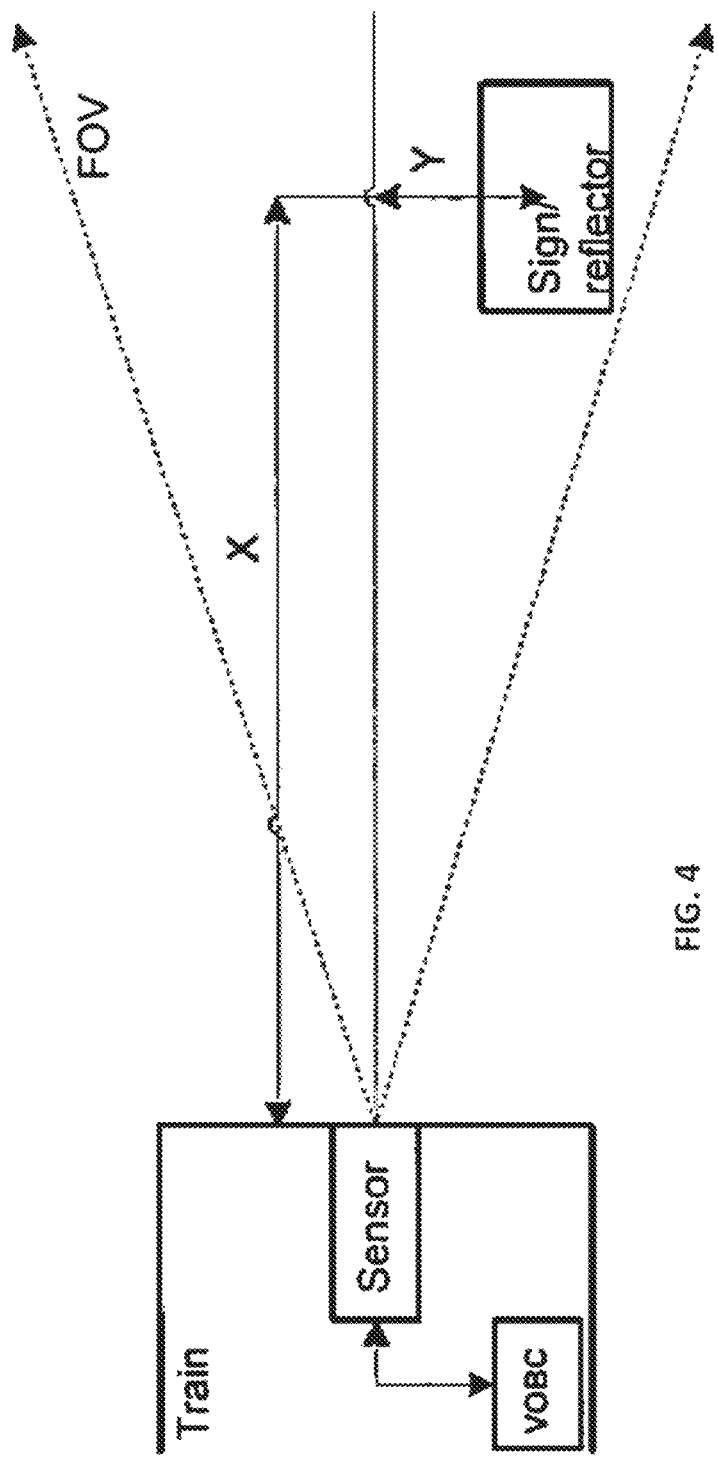
FIG. 4 is an on-board system architecture (horizontal view) in accordance with some embodiments.
Figure 5:
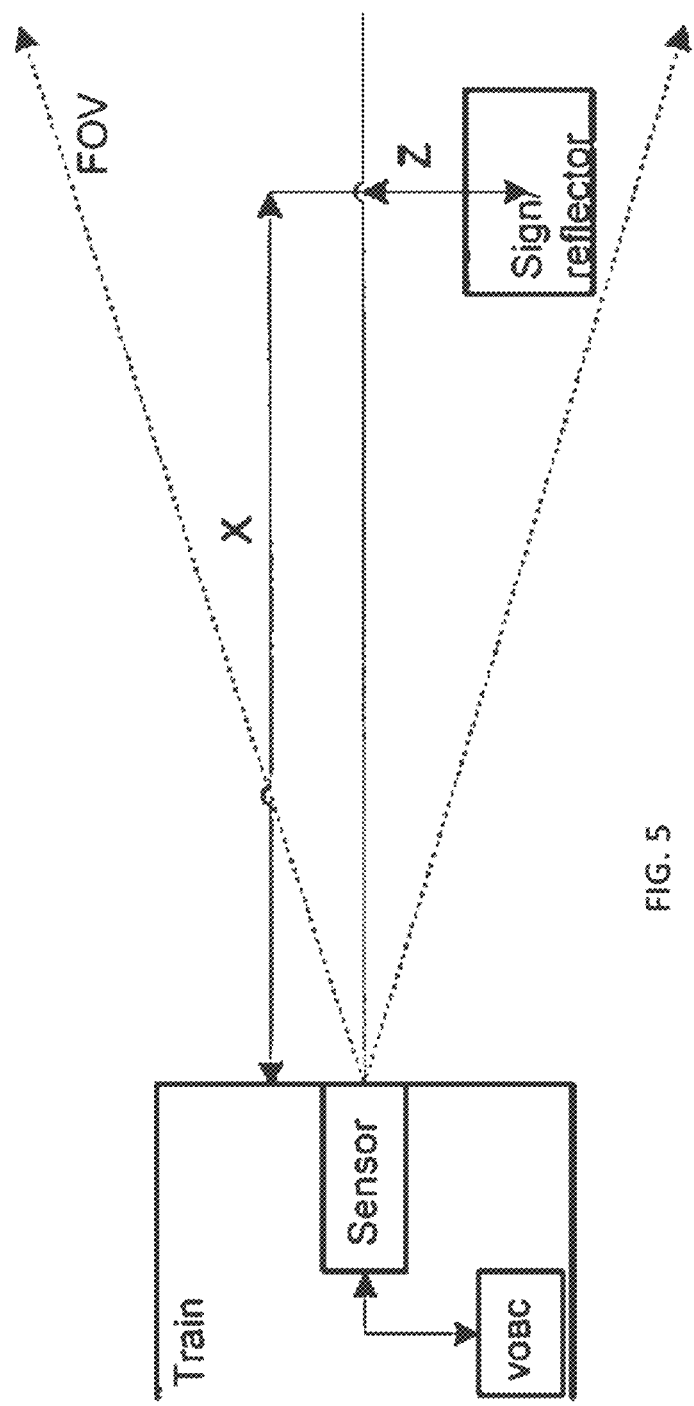
FIG. 5 is an on-board system architecture (vertical view) in accordance with some embodiments.

The block diagram of a non-limiting proposed on-board system is depicted in FIG. 4 and FIG. 5.

Detection of Signs and/or Reflectors/Transceivers Installed on the Trackside:

When the on-board central process of the VOBC detects an SSD/QR sign and/or reflector/transceiver, it identifies the sign's characters/pattern elements and/or the reflector/transceiver encoded data and perform sanity checks such as:

Is the ID a trackside ID associated with a sign or reflector/transceiver?
Did the detection occur in an expected location with respect to the previously detected trackside sign and/or reflector/transceiver?
Is the sign detected in its expected location within the camera's FOV?
Is the sign detected in its expected location with respect to the rails?
Is the ID extracted from the sign's characters/pattern elements and/or the reflector/transceiver encoded data the expected ID?
Is the safety signature extracted from the sign's characters/pattern elements and/or the reflector/transceiver encoded data the expected signature?

In some embodiments, the safety signature extraction corresponds to verifying the signature extracted from the sign's characters/pattern elements and/or the reflector/transceiver encoded data. In some embodiments, the verification corresponds to performing a hash or decoding function on the extracted signature.

In case one of these checks fails, then the sign and/or the reflector/transceiver is rejected and is not used to localize/re-localize the train, to determine the switch's attributes, to determine the authorized speed limit or to determine the authorized connected path. In some embodiments, in case more than one of these checks fails then the sign and/or the reflector/transceiver is rejected and is not used to localize/re-localize the train, to determine the switch's attributes, to determine the authorized speed limit or to determine the authorized connected path. In some embodiments, in case all of the checks fail, then the sign and/or the reflector/transceiver is rejected and is not used to localize/re-localize the train, to determine the switch's attributes, to determine the authorized speed limit or to determine the authorized connected path.

In case all of these checks are successful, then the sign and/or the reflector/transceiver are accepted and the sign used to localize/re-localize the train, to determine the switch's attributes, to determine the authorized speed limit and to determine the authorized connected path. In some embodiments, in case one, some, most, or all of these checks are successful then the sign and/or the reflector/transceiver is accepted and the sign is used to localize/re-localize the train, to determine the switch's attributes, to determine the authorized speed limit and to determine the authorized connected path. In some embodiments, in case a majority of the checks are successful, then the sign and/or the reflector/ transceiver is accepted and the sign is used to localize/relocalize the train, to determine the switch's attributes, to determine the authorized speed limit and to determine the authorized connected path.

In some embodiments, it is the Wayside controller's responsibility to ensure that the characters/pattern elements displayed on the dynamic portion of the wayside sign and the encoded data in the reflector/transceiver properly represents the actual switch attributes and the movement authority reserved for the train.

The above described method is used for, but not limited to, the configurations listed below:
- As the primary method to localize the vehicle on the guideway and to communicate with the wayside computer.
- As the primary method to localize the vehicle on the guideway and as a secondary (fallback) method to communicate with the wayside computer.
- As a secondary method to localize the vehicle on the guideway or secondary verification for tags and/or crossover detection, and as a secondary (fallback) method to communicate with the wayside computer.
- As a secondary method to localize the vehicle on the guideway or secondary verification for tags and/or crossover detection, and as the primary method to communicate with the wayside computer.

Detection of signs installed on other trains: When the on-board central process of the VOBC detects a SSD/QR sign and/or reflector/transceiver, it identifies the sign's characters/pattern elements and/or the reflector/transceiver encoded data and perform sanity checks such as:
- Is the ID a train ID?
- Is the sign detected in its expected, for coupled trains, location within the camera's FOV?
- Is the relative speed between the sensor and sign and/or reflector/transceiver equal zero within the expected tolerance?
- Does the range between the sensor and sign and/or reflector/transceiver match the distance between coupled married pairs within the expected tolerance?
- Does the sign displayed speed and/or the speed decoded from the reflector/transceiver indicate zero speed.
- Is the safety signature extracted from the sign's characters/pattern elements and/or the reflector/transceiver encoded data the expected signature?

In case one of these checks fail, then the train end associated with the sensor may not be coupled. In some embodiments, in case one, some, most, or all of these checks fail then the train end associated with the sensor may not be coupled. In case all of these checks are successful then the train end associated with the sensor is coupled. In some embodiments, in case one, some, most, or all of these checks are successful then the train end associated with the sensor may be determined to be coupled. Once coupled status is determined, the sign displayed speed and/or the speed decoded from the reflector/transceiver may change to non-zero without affecting the coupling status as the train may start to move as a complete train consist.

An on-board central process of the VOBC collects the coupling status from all sensors on-board the train to determine the train configuration. A married pair is determined to be a middle unit if it is coupled at both ends. A married pair is determined to be an end unit if it is coupled in one end and not coupled in the other end. A married pair is determined to be a single unit if it is not coupled in both ends.

In one or more embodiments, the train consist is subject to consistency checks such as one or more of:
- Is the number of end units in the train consist equal 2.
- Is the number of single units in the train consist equal 0.

In case all of these checks are successful, then the train consist is validated and the train length is determined as described below. In some embodiments, in case one, some, most, or all of these checks are successful, then the train consist is validated and the train length is determined as described below. In case at least one of the checks fails, then the train consist is not validated.

In at least one embodiment, the train length is determined to be the length of a single married pair times the sum of:
- The number of middle units in the train consist.
- The number of end units in the train consist.

Additional verification of the train length determination is applied by using, but not limited to, the methods listed below:
- Comparing the train length as determined by the method described above with the train length determined by calculating the distance travelled between the instant the front sensor detects the SSD/QR sign and/or reflector/transceiver and the instant the rear sensor detects the same SSD/QR sign and/or reflector/transceiver. The length should match within a predefined tolerance (e.g. +/−50 cm).
- Comparing the train length as determined by the method described above with the train length determined by subtracting the guideway location of the SSD/QR sign and/or reflector/transceiver detected by the front sensor and the guideway location of the SSD/QR sign and/or reflector/transceiver detected by the rear sensor compensated by the distance to the SSD/QR sign and/or reflector/transceiver. The length should match within a predefined tolerance (e.g. +/−50 cm).

In at least some embodiments, it is the Vehicle On-Board Controller associated with each sign and/or reflector/transceiver on the vehicle with the responsibility to ensure that the characters/pattern elements displayed on the dynamic portion of the sign and the encoded data in the reflector/transceiver properly represents the train ID and the train's actual speed.

Wayside Portion

Figure 6:
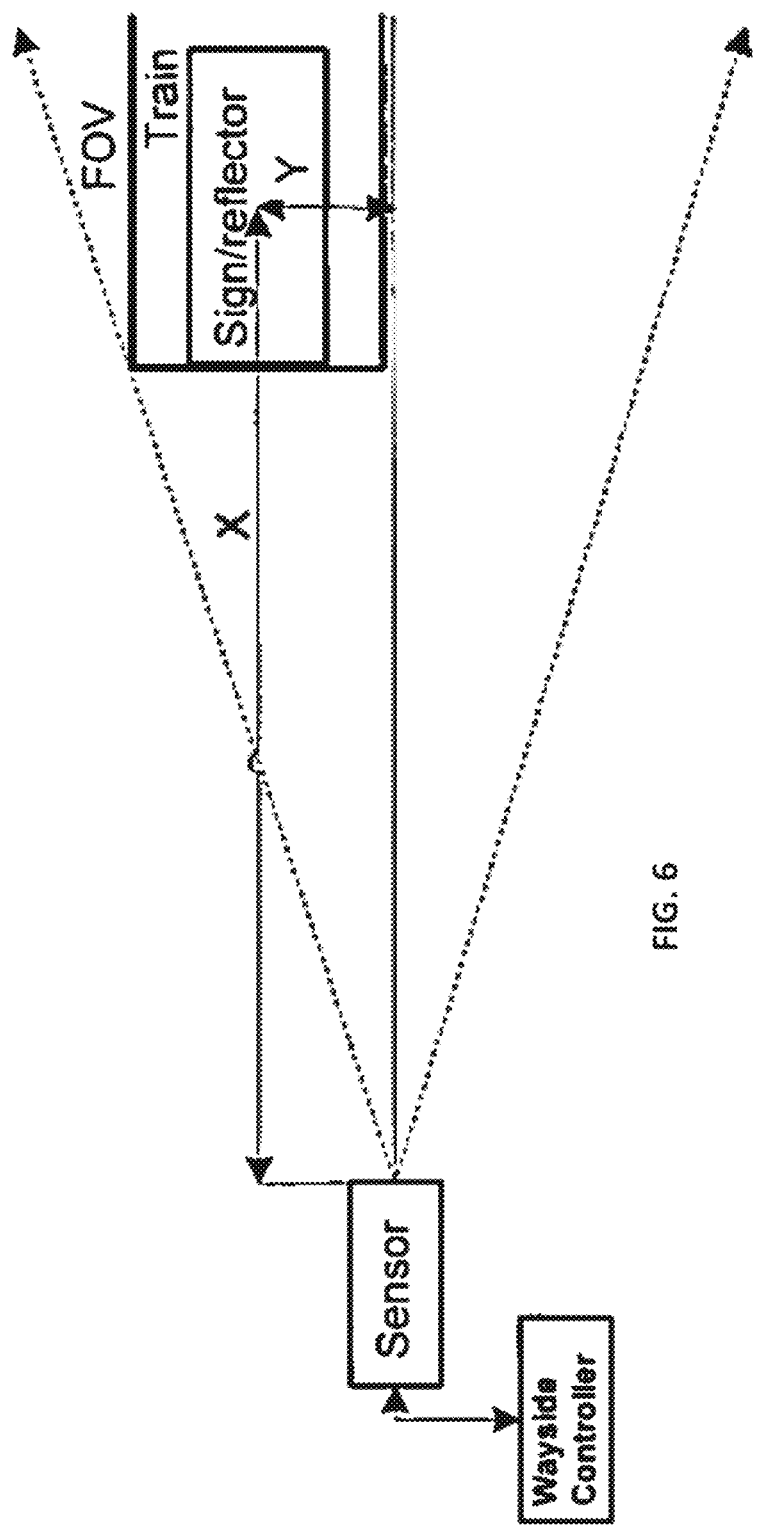
FIG. 6 is a wayside system architecture (horizontal view) in accordance with some embodiments.
Figure 7:
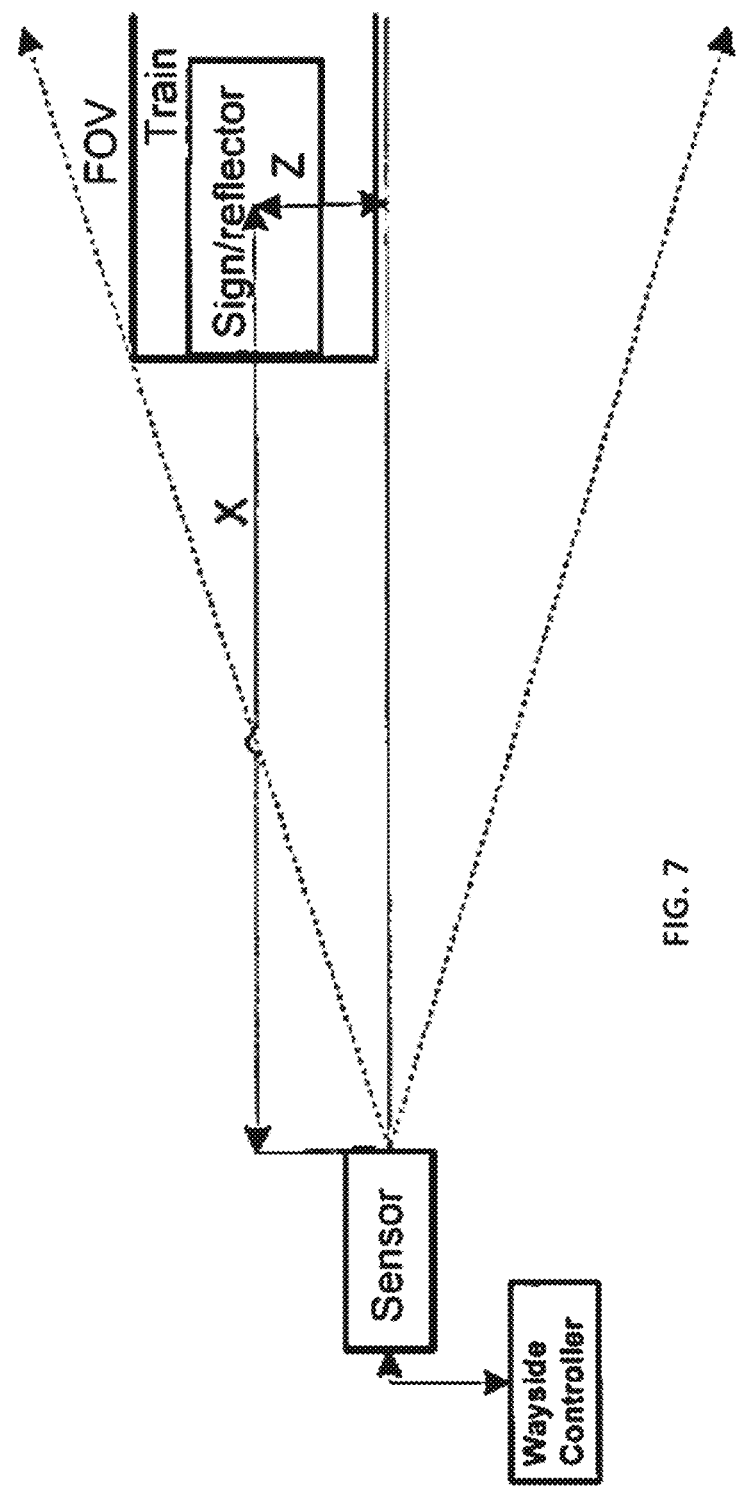
FIG. 7 is a wayside system architecture (vertical view) in accordance with some embodiments.
Figure 8:
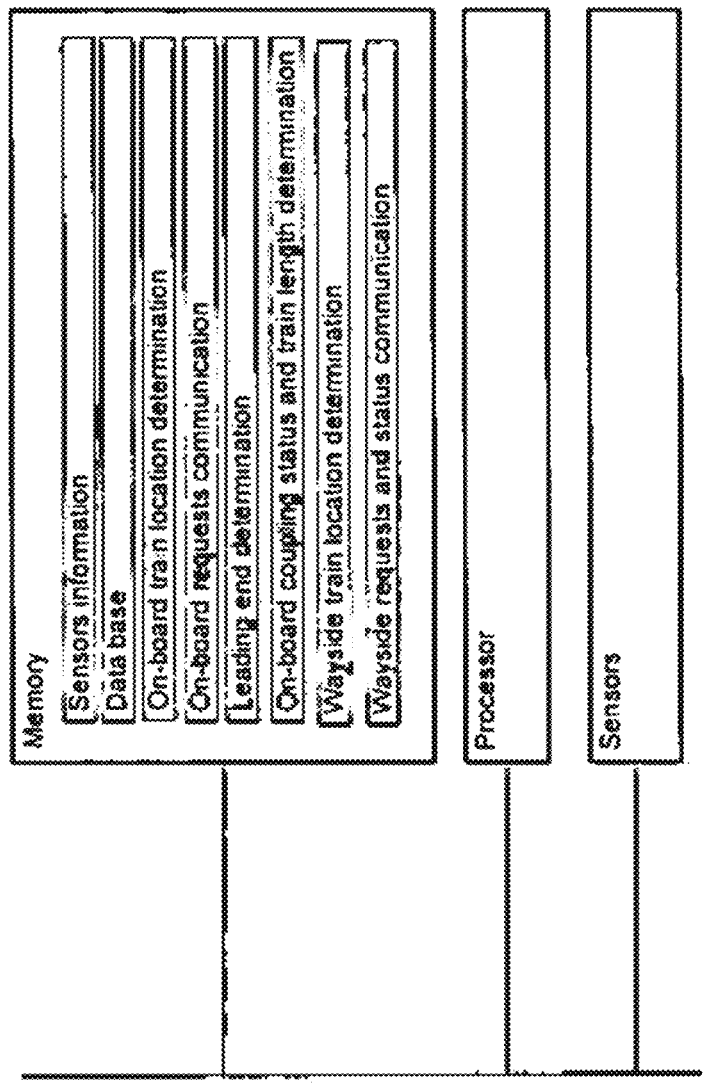
FIG. 8 shows sensors' interconnection to a computer in accordance with some embodiments.
Figure 9:
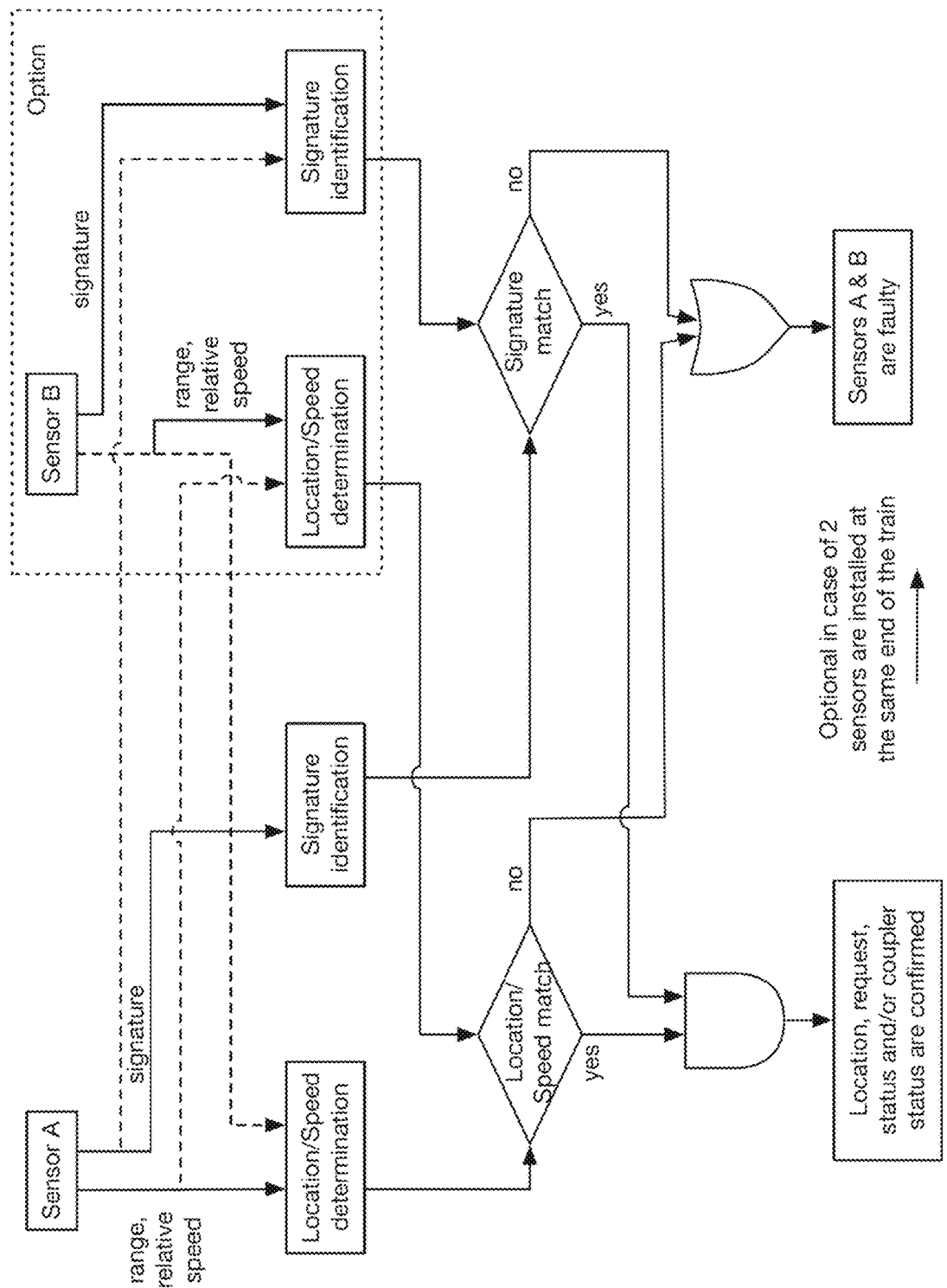
FIG. 9 shows a method of cross check between sensors in accordance with some embodiments.

The block diagram of the proposed wayside system is depicted at FIG. 6 and FIG. 7 below.

When the wayside central process detects a SSD/QR sign and/or a reflector/transceiver, it identifies the sign's characters/pattern elements and/or the reflector/transceiver encoded data and performs sanity checks such as:
- Is the sign and/or reflector/transceiver detected in its expected location on the train?
- Is the sign detected in its expected location within the camera's FOV?
- Is the train detected in its expected location with respect to the rails?
- Is the ID extracted from the sign's characters/pattern elements and/or the reflector/transceiver encoded data a train ID?
- Is the safety signature extracted from the sign's characters/pattern elements and/or the reflector/transceiver encoded data the expected signature?

In case one of these checks fails, then the sign and/or the reflector/transceiver is rejected and is not used to localize the train, to determine its speed, to request switch move/reserve/lock commands for the train or to request connected path reservation for the train. In some embodiments, in case one, some, most, or all of these checks fails then the sign and/or the reflector/transceiver is rejected and is not used to localize the train, to determine its speed, to request switch move/reserve/lock commands for the train or to request connected path reservation for the train.

In case all of these checks are successful, then the sign and/or the reflector/transceiver is accepted and it is used to localize the train, to determine its speed, to request switch move/reserve/lock commands for the train and/or to request connected path reservation for the train. In some embodiments, in case one, some, most, or all of these checks are successful then the sign and/or the reflector/transceiver is accepted and it is used to localize the train, to determine its speed, to request switch move/reserve/lock commands for the train and/or to request connected path reservation for the train.

In at least some embodiments, it is the Vehicle On-Board Controller associated with each sign and/or reflector/transceiver responsibility to ensure that the characters/pattern elements displayed on the dynamic portion of the sign and the encoded data in the reflector/transceiver properly represents the train ID, the actual train speed and its request to reserve/lock/move switches and reserve track elements along the requested connected path.

The on-board system is capable to determine its location, direction of travel and speed within a certain region around the SSD/QR wayside sign and/or RF reflectors/transceivers installed on the guideway, typically +/−10 m.

The on-board system is capable to determine its movement authority based on the wayside sign and/or RF reflectors/transceivers independently from the radio/loop communication link with the wayside system. In some embodiments, the on-board system applies a priority ranking to determine movement authority as between the radio/loop communication link and the wayside sign and/or RF reflectors/transceivers. In some embodiments, the on-board system relies on a most recently received communication from one or the other of the wayside sign and/or RF reflectors/transceivers and the radio/loop communication link.

The on-board system is capable to determine the couplers status and the length of the train without wiring electrical signals through the umbilical cables connecting the married pairs along the train. This results in a more reliable solution and more precise determination of train length.

The wayside system is capable to determine the train's location, direction of travel and speed, and the connected path the train is expected to consume independently from the radio/loop communication link with the on-board system. Additional information such as the next intended stop may be determined based on the on-board sign and/or RF reflectors/transceivers installed on the train.

Thus, aspects of the present disclosure enable simpler and less complex installation on the train and on the wayside.

(1) In at least some embodiments, the Vehicle On-Board Controller autonomously determines the following:
  Accurate train location on the guideway upon the detection of a trackside sign and/or reflector/transceiver.
  Authorized speed limit based on the speed restriction displayed on a trackside sign and/or encoded within a reflector/transceiver.
  Switch status (i.e., position reservation, lock) based on the switch attributes displayed on a trackside sign and/or encoded within a reflector/transceiver.
  Destination based on the destination displayed on a trackside sign and/or encoded within a reflector/transceiver.
  Coupling status of each married pair end based on range and relative speed to a sign and/or reflector/transceiver installed on each married pair front and rear faces.

(2) In at least some embodiments, the Wayside Controller determines the following:
  Train location and speed of the train based on the range and relative speed to a sign and/or reflector/transceiver installed on the train's front/rear face.
  The train speed based on a speed displayed on the sign and/or encoded within the reflector/transceiver installed on the train's front/rear face.
  The switch requests (i.e., move, reserve, lock) displayed on the sign and/or encoded within the reflector/transceiver installed on the train's front/rear face.
  The connected path request displayed on the sign and/or encoded within the reflector/transceiver installed on the train's front/rear face.

(3) In at least some embodiments, the Vehicle On-Board Controller displays the following information on the sign installed on the train's front/rear face:
  Train ID.
  Train speed.
  Switch requests (i.e. move, reserve, and lock).
  Connected path and destination.
  In at least some embodiments, the VOBC displays less than all of the information. In at least some embodiments, the VOBC displays at least the train ID.

(4) In at least some embodiments, the Vehicle On-Board Controller encodes the following information within the reflector/transceiver installed on the train's front/rear face:
  Train ID.
  Train speed.
  Switch requests (i.e. move, reserve, and lock).
  Connected path and destination.
  In at least some embodiments, the VOBC encodes less than all of the information. In at least some embodiments, the VOBC encodes at least the train ID.

(5) In at least some embodiments, the Wayside Controller displays the following information on the trackside sign:
  ID.
  Speed restriction.
  Switch status (i.e. position, reservation, lock).
  Destination.
  In at least some embodiments, the Wayside Controller displays less than all of the information. In at least some embodiments, the Wayside Controller displays at least the ID.

(6) In at least some embodiments, the Wayside Controller encodes the following information within the reflector/transceiver installed on the trackside:
  ID.
  Speed restriction.
  Switch status (i.e. position, reservation, lock).
  Destination.
  In at least some embodiments, the Wayside Controller encodes less than all of the information. In at least some embodiments, the Wayside Controller encodes at least the ID.

This system is also usable to replace the wireless radio communication system, which is the current technology used to transfer information between the Vehicle On-Board Controller and the Zone Controller (Wayside Controller). Or, as a diverse wireless communication channel using alternate media such as the optical spectrum if a camera is used, different RF frequency, if a 77/24 GHZ radar is used. In other embodiments, different frequency radar is contemplated.

The system is also usable to control guided mass transit vehicles such as BAT in automatic autonomous mode of operation.

In some embodiments, aspects of the present disclosure enable determination of:
(1) The train location on the guideway.
(2) The train movement authority.
(3) The length of the train and/or
(4) The coupler status of each vehicle (married pair) and the consist (integrity) of the train.

In some embodiments, aspects of the present disclosure include use of radar, LIDAR, camera and/or IR based sensors installed in one or more of the following locations:
(1) Two sets of sensors at each end of the train connected to a computer with processing capacity comparable with an INTEL Pentium processor, and non-volatile memory.
   a. One set of diverse sensors are oriented towards predetermined SSD/QR signs and/or RF reflectors/transceivers installed on the trackside which are usable as fixed landmarks. These sensors enable the on-board system to determine the location of the train to high accuracy (+/−5 cm) where needed and to determine if the train is authorized to proceed along a certain connected path on the guideway.
   b. Second set of sensors are oriented horizontally "forward" looking along the train's main axis. These sensors enable the on-board system to determine the status of the coupler associated with this end and the length of the train. That is for example, these sensors detect whether the train is coupled to another train by detection of an SSD/QR sign and/or RF reflector/transceiver on another train and moving at the same speed as the current train.
(2) At predetermined guideway locations such as platforms and/or switch zones connected to a computer with processing capacity comparable with an INTEL Pentium processor, and non-volatile memory. The diverse sensors are oriented toward SSD/QR signs and/or RF reflectors/transceivers installed on the train's faces which are used as diverse transmission media from the train to the wayside system. These sensors enable the wayside system to determine the location of the train to high accuracy (+/−5 cm) where needed, the speed of the train and the connected path (route) the train is intended to use.

In some embodiments, a key element in the proposed system is the novel use of radar, LIDAR, camera and/or IR based sensors installed at each end of the train for location determination, full duplex diverse communication channel between the train and the trackside and vice versa, and for coupling status and train length determination. These sensors are capable to:

Detect and decode QR signs and/or signs with 7 segments characters;

Detect and decode RF reflectors and/or transceivers; and/or

Determine the range and relative speed to a sign and/or RF reflector/transceiver.

The content displayed on the signs or encoded within the RF reflector/transceiver is dynamically controlled by the system, e.g., either the VOBC on-board the train or the Wayside Controller adjacent the guideway, serving as an alternate and diverse communication channel between the train and the trackside.

Sensor(s) system: The sensor system is responsible to provide accurate detection and identification of sign and/or RF reflector/transceiver signature such as 7 segments characters or QR signature for signs, and bits encoded within an RF device either spatially within a reflector or within a transceiver's memory. The sensor system may provide quantitative indication to the Vehicle On-Board Controller and/or to the Wayside Controller regarding the quality of each sign and/or RF reflector/transceiver detection.

On-board train location determination function: In some embodiments, this function is implemented within the Vehicle On-Board Controller. This function utilizes the feature that the sensor or sensors provide accurate detection and identification of a signature displayed on signs such as 7 segments characters and QR signature, and/or signature embedded within RF devices such as reflector and/or transceiver. Upon detection of a trackside sign and/or reflector/transceiver, the range and relative speed between the sensor and the sign and/or reflector/transceiver is determined and the associated signature embedded within the sign and/or reflector/transceiver is used to localize the train on the guideway to its database location.

On-board requests communication function: In some embodiments, this function is implemented within the Vehicle On-Board Controller. This function uses the feature that the signature displayed on signs such as 7 segments characters and QR signature, and/or signature embedded within RF devices such as a transceiver is dynamically controllable by the Vehicle On-Board Controller to display the train's speed, switch related requests (e.g., move, reserve and lock) and route related requests on signs and/or transceivers installed on the train. The train's signs and/or transceivers are usable as:

Alternate and diverse unidirectional communication channel from the train to the trackside expressing the train's needs related to the switch and route resources.

Alternate and diverse communication channel from one married pair to another married pair informing the train ID and its speed.

On-board coupling status and train length determination function: In some embodiments, this function is implemented within the Vehicle On-Board Controller. This function uses the feature that the sensor or sensors provides accurate detection and identification of a signature displayed on signs such as 7 segments characters and QR signature, and/or signature embedded within RF devices such as reflector and/or transceiver. Upon detection of a train sign and/or reflector/transceiver, the range and relative speed between the sensor and the sign and/or reflector/transceiver is determined and the associated signature embedded within the sign and/or reflector/transceiver is used to identify the train. If the ID is of another train, the range matches the expected range for coupled trains and the relative speed is zero, then the two married pairs are coupled.

Wayside train location determination function: In some embodiments, this function is implemented within the Wayside Controller. This function uses the feature that the sensor or sensors provides accurate detection and identification of a signature displayed on signs such as 7 segments characters and QR signature, and/or signature embedded within RF devices such as reflector and/or transceiver. Upon detection of a train sign and/or reflector/transceiver, the range and relative speed between the sensor and the sign and/or reflector/transceiver is determined and the associated signature embedded within the sign and/or reflector/transceiver is used to localize the train on the guideway.

Wayside requests and status communication function: In some embodiments, this function is implemented within the Wayside Controller. This function uses the feature that the signature displayed on signs such as 7 segments characters and QR signature, and/or signature embedded within RF devices such as a transceiver is dynamically controlled by the Wayside Controller to display the information below on signs and/or transceivers installed on trackside train.

The ID of the Wayside Controller;

The ID of the device such as switch controlled by the Wayside Controller;

The switch position including lock status, and its reservation and logical lock status;

Track related restrictions such as closed tracks and speed limits; or

Authorized route for the train.

The train's signs and/or transceivers are usable as an alternate and diverse unidirectional communication channel from the trackside to the train expressing the switch and route resources available to the train.

One or more of the following characteristics of the proposed system are considered novel, among others:

Accurate location determination by identifying and verifying a unique signature displayed on a sign.

Accurate location determination by identifying and verifying a unique signature encoded within a RF reflector/transceiver.

Diverse communication channel between the train and the wayside controller and vice versa by dynamically controlling the pattern elements displayed by a sign.

Diverse communication channel between the train and the wayside controller and vice versa by dynamically controlling the data encoded within a RF reflectors/transceiver.

Range and relative speed determination to a sign and/or RF reflector/transceiver.

Use 7 segments characters and/or QR signature as a unique signature to identify trackside markers and trains.

Using encoded signature either spatially within a reflector or embedded with a transceiver's memory as a unique signature to identify trackside markers and trains.

Dynamic real-time control of signs and RF transceivers signatures as an alternate and diverse channel to communicate information between the train and the trackside and vice versa.

One or more of the following characteristics of the proposed system are considered particularly advantageous over prior systems:

Train location on the guideway is determined by identification of a unique signature displayed on a sign and/or embedded within a RF device.

Simple sign capable to adapt its displayed signature based on external command serves as an alternate and diverse communication channel between the train and the trackside and vice versa.

Simple transceiver capable to adapt its embedded signature based on external command serves as an alternate and diverse communication channel between the train and the trackside and vice versa.

Train coupling status and length are determined by identification of a unique signature displayed on a sign and/or embedded within a RF device, and the range and relative speed to the sign and/or the RF device.

Figure 10:
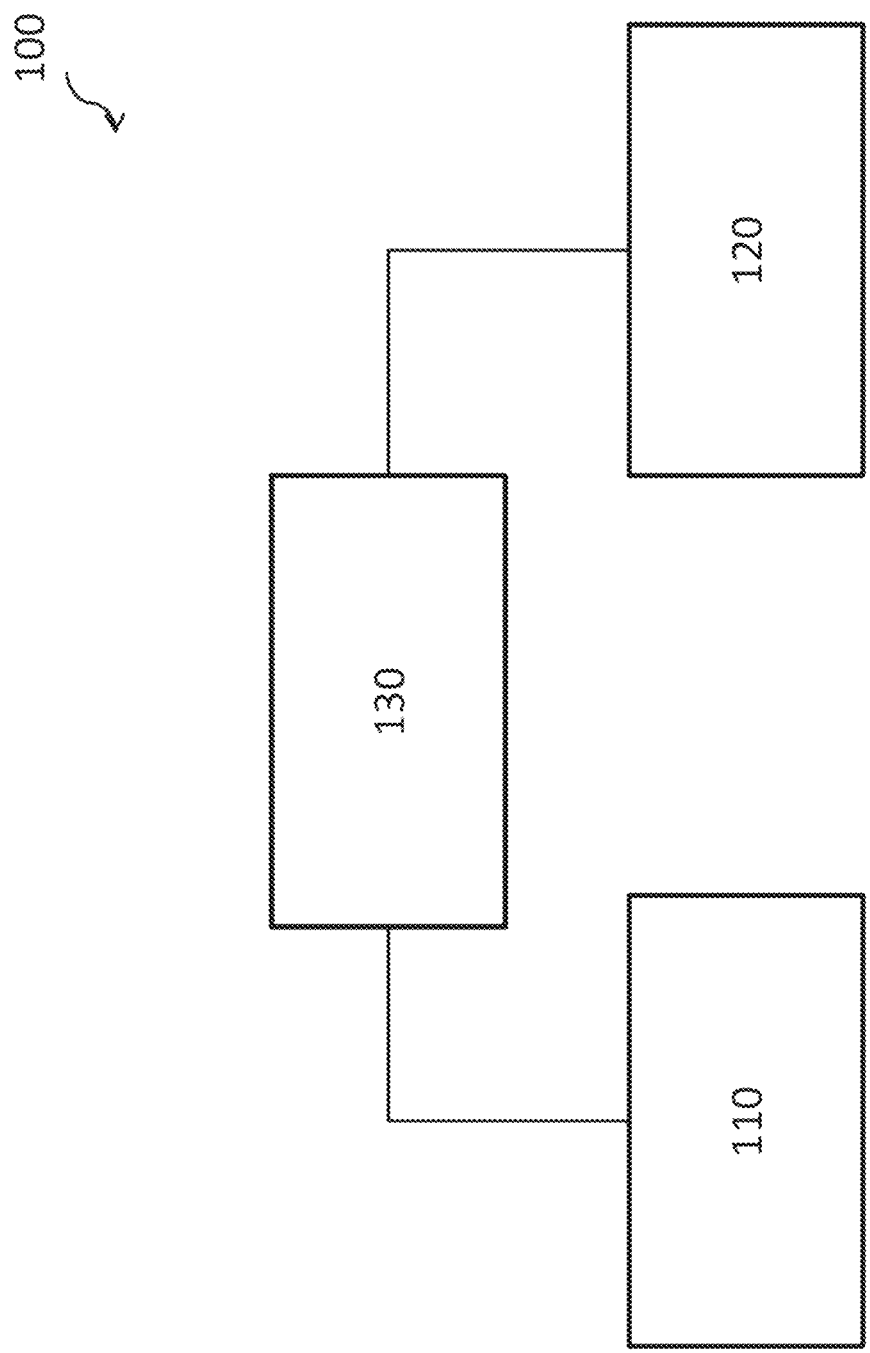
FIG. 10 is a high level diagram of a fusion sensor arrangement in accordance with one or more embodiments.

In some embodiments, one or more sensors described hereinbelow may be used. Unless otherwise noted, reference characters herein below refer to FIGS. 10-15. FIG. 10 is a high level diagram of a fusion sensor arrangement 100 in accordance with one or more embodiments. Fusion sensor arrangement 100 includes a first sensor 110 configured to receive a first type of information. Fusion sensor arrangement 100 further includes a second sensor 120 configured to receive a second type of information different from the first type of information. Fusion sensor arrangement 100 is configured to fuse information received by first sensor 110 with information received by second sensor 120 using a data fusion center 130. Data fusion center 130 is configured to determine whether an object is detected within a detection field of either first sensor 110 or second sensor 120. Data fusion center 130 is also configured to resolve conflicts between first sensor 110 and second sensor 120 arising when one sensor provides a first indication and the other sensor provides a contradictory indication.

In some embodiments, fusion sensor arrangement 100 is integrated with a vital on-board controller (VOBC) configured to generate movement instructions for a guideway mounted vehicle and to communicate with devices external to the guideway mounted vehicle. In some embodiments, fusion sensor arrangement 100 is separate from a VOBC and is configured to provide fused data to the VOBC.

First sensor 110 is configured to be attached to the guideway mounted vehicle. First sensor 110 includes a first detection field which includes an angular range in both a horizontal direction and in a vertical direction. The horizontal direction is perpendicular to a direction of travel of the guideway mounted vehicle and parallel to a top surface of a guideway. The vertical direction is perpendicular to the direction of travel of the guideway mounted vehicle and to the horizontal direction. The angular range in the horizontal direction facilitates detection of objects both along the guideway and along a wayside of the guideway. The angular range in the horizontal direction also increases a line of sight of first sensor 110 in situations where the guideway changes heading. The angular range in the vertical direction increases a line of sight of first sensor 110 in situations where the guideway changes elevation. The angular range in the vertical direction also facilitates detection of overpasses or other height restricting objects.

In some embodiments, first sensor 110 is an optical sensor configured to capture information in a visible spectrum. In some embodiments, first sensor 110 includes a visible light source configured to emit light which is reflected off objects along the guideway or the wayside of the guideway. In some embodiments, the optical sensor includes a photodiode, a charged coupled device (CCD), or another suitable visible light detecting device. The optical sensor is capable of identifying the presence of objects as well as unique identification codes associated with detected objects. In some embodiments, the unique identification codes include barcodes, alphanumeric sequences, pulsed light sequences, color combinations, geometric representations or other suitable identifying indicia.

In some embodiments, first sensor 110 includes a thermal sensor configured to capture information in an infrared spectrum. In some embodiments, first sensor 110 includes an infrared light source configured to emit light which is reflected off objects along the guideway or the wayside of the guideway. In some embodiments, the thermal sensor includes a Dewar sensor, a photodiode, a CCD or another suitable infrared light detecting device. The thermal sensor is capable of identifying the presence of an object as well as unique identifying characteristics of a detected object similar to the optical sensor.

In some embodiments, first sensor 110 includes a RADAR sensor configured to capture information in a microwave spectrum. In some embodiments, first sensor 110 includes a microwave emitter configured to emit electromagnetic radiation which is reflected off objects along the guideway or the wayside of the guideway. The RADAR sensor is capable of identifying the presence of an object as well as unique identifying characteristics of a detected object similar to the optical sensor.

In some embodiments, first sensor 110 includes a laser sensor configured to capture information within a narrow bandwidth. In some embodiments, first sensor 110 includes a laser light source configured to emit light in the narrow bandwidth which is reflected off objects along the guideway or the wayside of the guideway. The laser sensor is capable of identifying the presence of an object as well as unique identifying characteristics of a detected object similar to the optical sensor.

In some embodiments, first sensor 110 includes a radio frequency identification (RFID) reader configured to capture information in a radio wave spectrum. In some embodiments, first sensor 110 includes a radio wave emitter configured to emit an interrogation signal which is reflected by objects on the guideway or on the wayside of the guideway. The RFID reader is capable of identifying the presence of an object as well as unique identifying characteristics of a detected object similar to the optical sensor.

First sensor 110 is configured to identify an object and to track a detected object. Tracking of the detected object helps to avoid reporting false positives because rapid positional changes of the detected object enable a determination that first sensor 110 is not operating properly or that a transitory error occurred within the first sensor.

Second sensor 120 is configured to be attached to the guideway mounted vehicle. Second sensor 120 includes a second detection field which includes an angular range in both a horizontal direction and in a vertical direction. In some embodiments, the second detection field substantially matches the first detection field in order to reduce a risk of conflicts between first sensor 110 and second sensor 120. In some embodiments, the second detection field overlaps with a portion of the first detection field.

In some embodiments, second sensor 120 includes an optical sensor, a thermal sensor, a RADAR sensor, a laser sensor, or an RFID reader. Second sensor 120 is a different type of sensor from first sensor 110. For example, in some embodiments, first sensor 110 is an optical sensor and second sensor 120 is an RFID reader.

Utilizing first sensor 110 and second sensor 120 capable of detecting different types of information, e.g., different electromagnetic spectrums, enables fusion sensor arrangement 100 to reduce a risk of failing to detect an object along the guideway or the wayside of the guideway. Using sensors capable of detecting different types of information also enables confirmation of a detected object. For example, an optical sensor detects a bar code sign located on a wayside of the guideway. In instances where the bar code is defaced by dirt or graffiti such that the optical sensor cannot uniquely identify the bar code sign, an RFID reader may still be able to confirm the identifying information of the bar code sign based on an RF transponder attached to the bar code sign.

First sensor 110 and second sensor 120 are capable of identifying an object without additional equipment such as a guideway map or location and speed information. The ability to operate without additional equipment decreases operating costs for first sensor 110 and second sensor 120 and reduces points of failure for fusion sensor arrangement 100.

Data fusion center 130 includes a non-transitory computer readable medium configured to store information received from first sensor 110 and second sensor 120. Data fusion center 130 also includes a processor configured to execute instructions for identifying objects detected by first sensor 110 or second sensor 120. The processor of data fusion center 130 is further configured to execute instructions for resolving conflicts between first sensor 110 and second sensor 120.

Data fusion center 130 is configured to receive information from first sensor 110 and second sensor 120 and confirm detection of an object and whether the detected object contains identifying information. Data fusion center 130 is further configured to determine a distance from the fusion sensor arrangement 100 to the detected object, a relative speed of the object, a heading angle of the object and an elevation angle of the object.

Based on these determinations, data fusion center 130 is capable of tracking the detected object as the guideway mounted vehicle travels along the guideway to determine whether the object is on the guideway or on the wayside of the guideway. Tracking the object means that a location and relative speed of the object are regularly determined in a time domain. In some embodiments, the location and relative speed of the object are determined periodically, e.g., having an interval ranging from 1 second to 15 minutes. In some embodiments, the location and relative speed of the object are determined continuously.

Data fusion center 130 is also capable of comparing information from first sensor 110 with information from second sensor 120 and resolving any conflicts between the first sensor and the second senor. Data fusion center 130 is configured to perform plausibility checks to help determine whether a sensor is detecting an actual object. In some embodiments, the plausibility check is performed by tracking a location of the object. In some embodiments, a relative change in the location of the object with respect to time which exceeds a threshold value results in a determination that the detected object is implausible. When an implausible determination is made, data fusion center 130 considers information received from the other sensor to be more reliable. In some embodiments, data fusion center 130 initiates a status check of a sensor which provides implausible information. In some embodiments, data fusion center initiates a status check of a sensor which provides implausible information multiple times within a predetermined time period.

In some embodiments, when one sensor detects an object but the other sensor does not, data fusion center 130 is configured to determine that the object is present. In some embodiments, data fusion center 130 initiates a status check of the sensor which did not identify the object. In some embodiments, data fusion center 130 initiates a status check of the sensor which did not identify the object based on a type of object detected. For example, a thermal sensor is not expected to identify RFID transponder; therefore, the data fusion center 130 would not initiate a status check of the thermal sensor, in some embodiments.

In some embodiments, when one sensor detects a first type of object and the other sensor detects a second type of object different from the first type of object data fusion center 130 selects the object type based on a set of priority rules. In some embodiments, the priority rules give a higher priority to a certain type of sensor, e.g., a RADAR sensor over a laser sensor. In some embodiments, priority between sensor types is determined based on a distance between fusion sensor arrangement 100 and the detected object. For example, priority is given to the RADAR sensor if the distance between fusion sensor arrangement 100 and the detected object is greater than 100 meters (m) and priority is given to the laser sensor if the distance is less than 100 m or less.

Data fusion center 130 is a vital system. In some embodiments, data fusion center 130 has a safety integrity level 4 (SIL 4). In some embodiments, SIL 4 is based on International Electrotechnical Commission's (IEC) standard IEC 61508, in at least one embodiment. SIL level 4 means the probability of failure per hour ranges from $10^{-8}$ to $10^{-9}$.

Fusion sensor arrangement 100 is able to achieve a low rate of failure through the use of two separate sensor configured to detect objects using diverse detection techniques. In some embodiments, each sensor is designed to have a failure rate of about $3.8 \times 10^{-5}$ failures per hour, meaning a single failure every three years. A probability of two sensors having a failure at a same time is about $T \times 3.6 \times 10^{-10}$ failures per hour, where T is an expected time interval between detected objects. In some embodiments, T ranges from about 2 minutes to about 40 minutes. In some embodiments, if fusion sensor arrangement 100 fails to detect an object within 2T, the fusion sensor arrangement is determined to be faulty and is timed out.

The above description is based on the use of two sensors, first sensor 110 and second sensor 120, for the sake of clarity. One of ordinary skill in the art would recognize that additional sensors are able to be incorporated into fusion sensor arrangement 100 without departing from the scope of this description. In some embodiments, redundant sensors which are a same sensor type as first sensor 110 or second sensor 120 are included in fusion sensor arrangement 100. In some embodiments, additional sensors of different sensor type from first sensor 110 and second sensor 120 are included in fusion sensor arrangement 100.

Data fusion center 130 is also capable of identifying location determining information such as the unique identification information for the object. Data fusion center 130 is able to provide information regarding whether the guideway mounted vehicle is aligned with an object, e.g., for positioning doors for passenger vehicles with platform openings.

Figure 11:
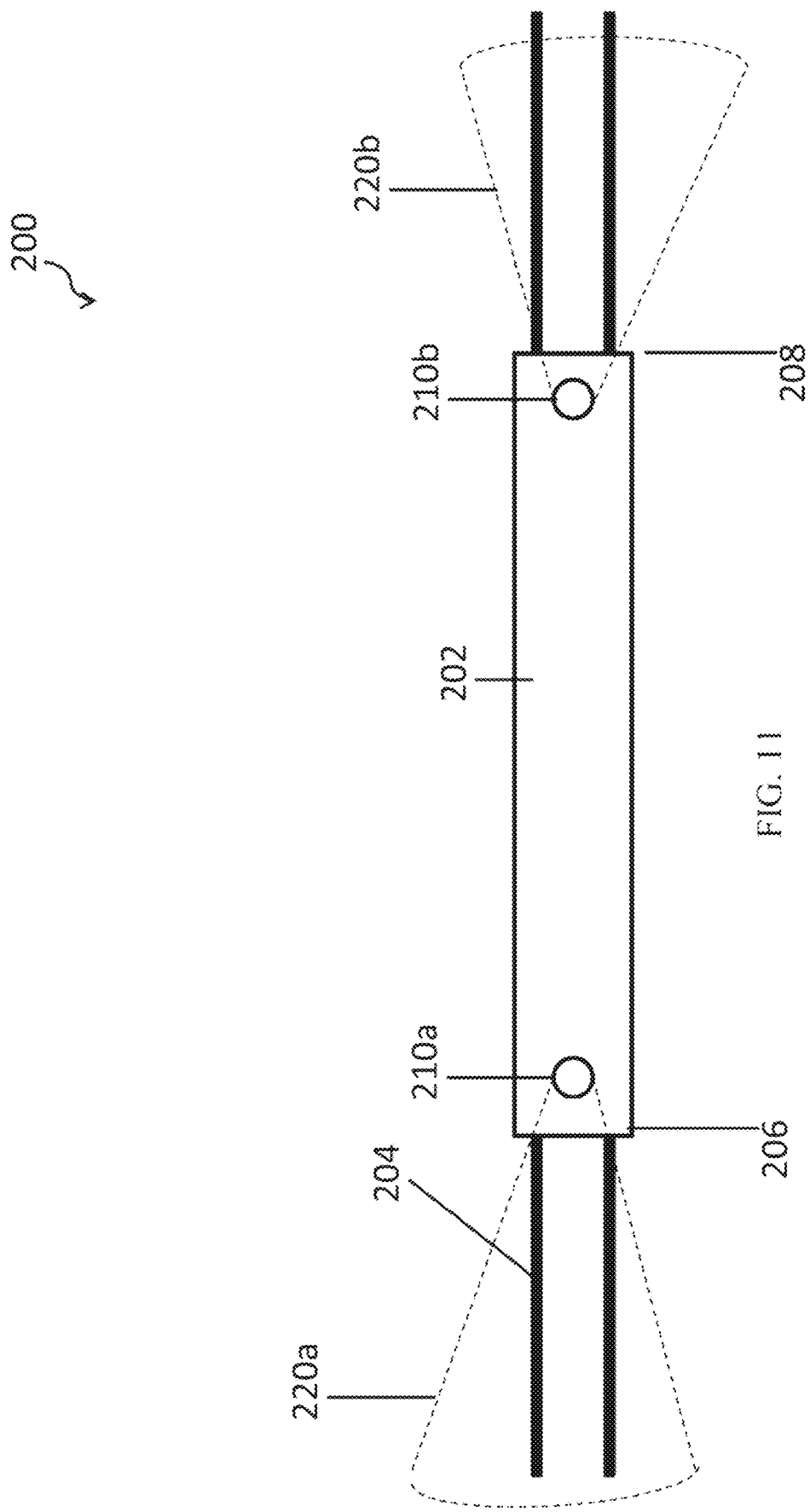
FIG. 11 is a high level diagram of a guideway mounted vehicle including fusion sensor arrangements in accordance with one or more embodiments.

FIG. 11 is a high level diagram of a guideway mounted vehicle 202 including fusion sensor arrangements 210a and 210b in accordance with one or more embodiments. Guideway mounted vehicle 202 is positioned on a guideway 204. Guideway mounted vehicle 202 has a first end 206 and a second end 208. A first fusion sensor arrangement 210a is located at first end 206 and a second fusion sensor arrangement 210b is located at second end 208. First fusion sensor arrangement 210a has a first field of detection 220a extending from first end 206. First field of detection 220a extends in an angular range in the horizontal direction and in the vertical direction. Second fusion sensor arrangement 210b has a second field of detection 220b extending from second end 208. Second field of detection 220b extends in an angular range in the horizontal direction and in the vertical direction.

Guideway mounted vehicle 202 is configured to traverse along guideway 204. In some embodiments, guideway mounted vehicle 202 is a passenger train, a cargo train, a tram, a monorail, or another suitable vehicle. In some embodiments, guideway mounted vehicle 202 is configured for bi-directional travel along guideway 204.

Guideway 204 is configured to provide a direction and heading of travel for guideway mounted vehicle 202. In some embodiments, guideway 204 includes two spaced rails. In some embodiments, guideway 204 includes a monorail. In some embodiments, guideway 204 is along a ground. In some embodiments, guideway 204 is elevated above the ground.

First end 206 and second end 208 are a corresponding leading end and trailing end of guideway mounted vehicle 202 depending on a direction of travel of the guideway mounted vehicle. By attaching fusion sensor arrangements 210a and 210b at both first end 206 and second end 208, either first detection field 220a or second detection field 220b extend in front of guideway mounted vehicle 202 in the direction of travel.

First fusion sensor arrangement 210a and second fusion sensor arrangement 210b are similar to fusion sensor arrangement 100 (FIG. 10). In some embodiments, at least one of first fusion sensor arrangement 210a or second fusion sensor arrangement 210b is integrated with a VOBC on guideway mounted vehicle 202. In some embodiments, both first fusion sensor arrangement 210a and second fusion sensor arrangement 210b are separate from the VOBC. In some embodiments, at least one of first fusion sensor arrangement 210a or second fusion sensor arrangement 210b is detachable from guideway mounted vehicle to facilitate repair and replacement of the fusion sensor arrangement.

Figure 12:
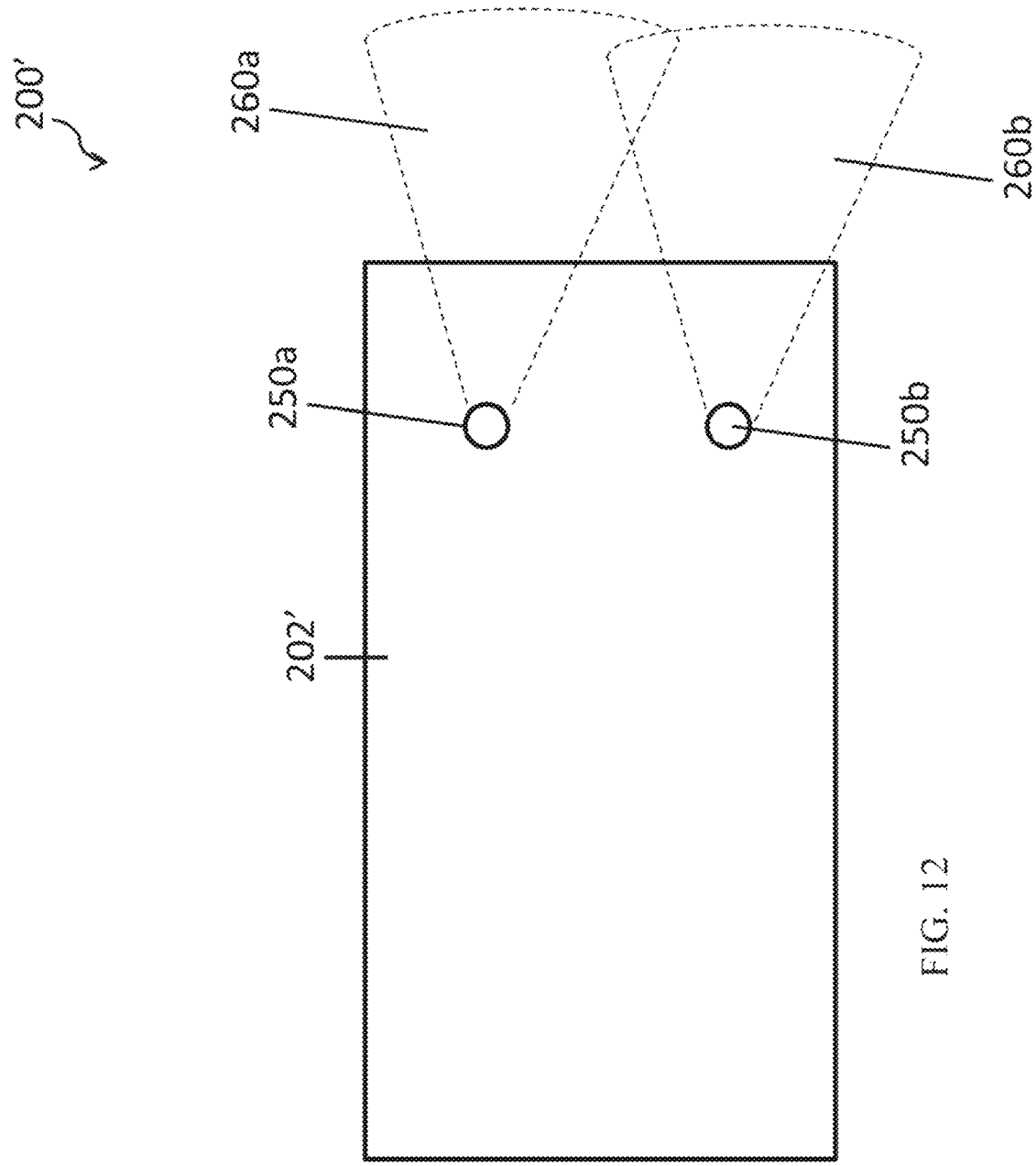
FIG. 12 is a high level diagram of a guideway mounted vehicle including fusion sensor arrangements in accordance with one or more embodiments.

FIG. 12 is a high level diagram of a guideway mounted vehicle 200' including fusion sensor arrangements 250a and 250b in accordance with one or more embodiments. FIG. 12 includes only a single end of guideway mounted vehicle 200' for simplicity. Guideway mounted vehicle 200' includes a first fusion sensor arrangement 250a and a second fusion sensor arrangement 250b. First fusion sensor arrangement 250a has a first field of detection 260a. Second fusion sensor arrangement 250b has a second field of detection 260b. First field of detection 260a overlaps with second field of detection 260b.

First fusion sensor arrangement 250a and second fusion sensor arrangement 250b are similar to fusion sensor arrangement 100 (FIG. 10). In some embodiments, first fusion sensor arrangement 250a has a same type of sensors as second fusion sensor arrangement 250b. In some embodiments, first fusion sensor arrangement 250a has at least one different type of sensor from second fusion sensor arrangement 250b. By using multiple fusion sensor arrangements 250a and 250b, a position of an objection is able to be triangulated by measuring a distance between each fusion sensor arrangement and the object.

Figure 13:
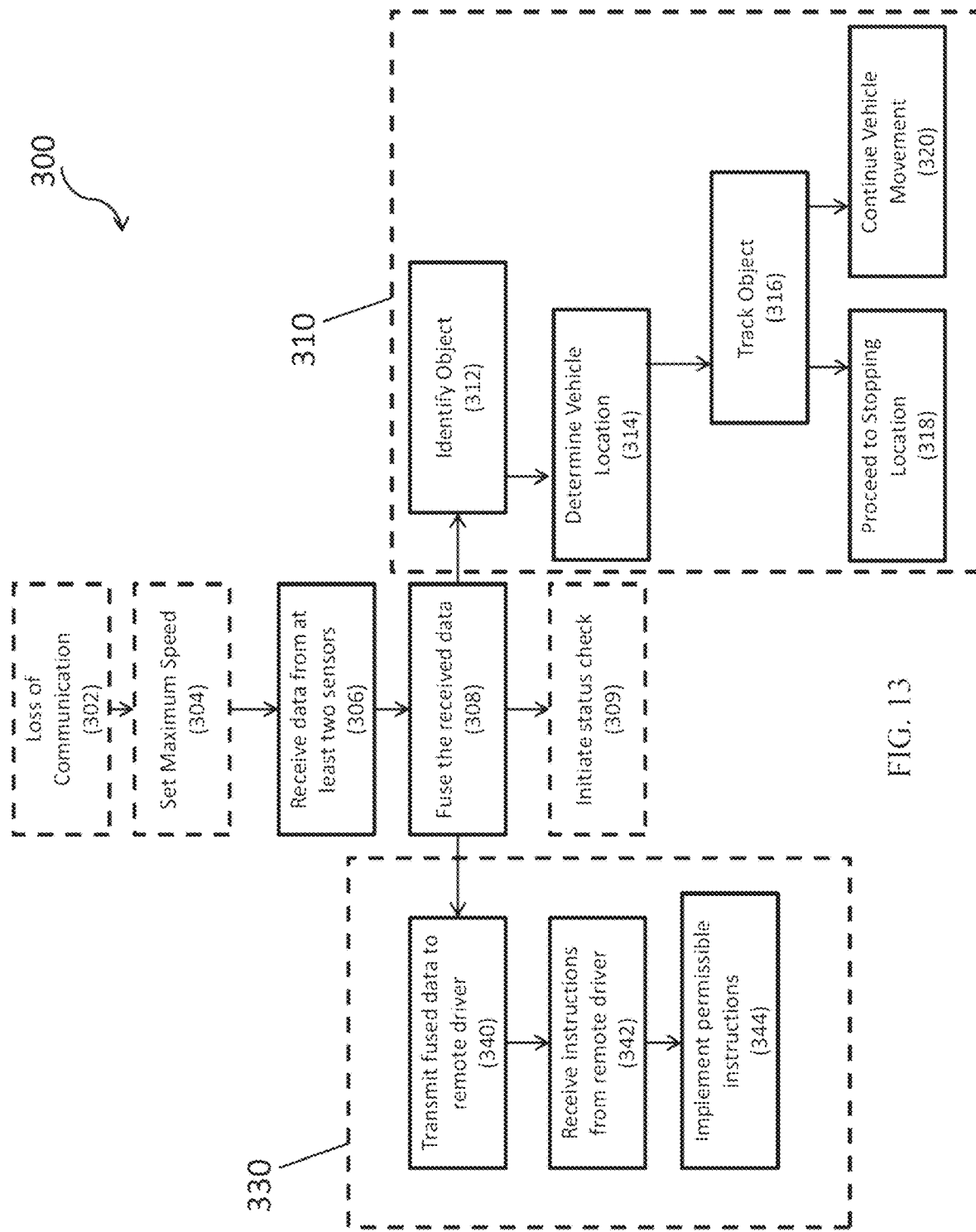
FIG. 13 is a flow chart of a method of controlling a guideway mounted vehicle using a fusion sensor arrangement in accordance with one or more embodiments.

FIG. 13 is a flow chart of a method 300 of controlling a guideway mounted vehicle using a fusion sensor arrangement in accordance with one or more embodiments. The fusion sensor arrangement in method 300 is used in combination with a VOBC. In some embodiments, the fusion sensor arrangement is integrated with the VOBC. In some embodiments, the fusion sensor arrangement is separable from the VOBC. In optional operation 302, the VOBC communication with a centralized or de-centralized control system is lost. In some embodiments, communication is lost due to a device failure. In some embodiments, communication is lost due to signal degradation or corruption. In some embodiments, communication is lost due to blockage of the signal by a terrain. In some embodiments, operation 302 is omitted. Operation 302 is omitted in some embodiments where the fusion sensor arrangement is operated simultaneously with instructions received from centralized or de-centralized communication system.

In some embodiments, information received through the fusion sensor arrangement is transmitted via the VOBC to the centralized or de-centralized communication system. In some embodiments, information received through the fusion sensor arrangement is provided to a remote driver to facilitate control of the guideway mounted vehicle by the remote driver. In some embodiments, the remote driver is able to receive images captured by the fusion sensor arrangement. In some embodiments, the remote driver is able to receive numerical information captured by the fusion sensor arrangement. In some embodiments, the VOBC is configured to receive instructions from the remote driver and automatically control a braking and acceleration system of the guideway mounted vehicle.

In optional operation 304, a maximum speed is set by the VOBC. The maximum speed is set so that the guideway mounted vehicle is capable of braking to a stop within a line of sight distance of the fusion sensor arrangement. In situations where the VOBC relies solely on the fusion sensor arrangement for the detection of objects along the guideway or the wayside of the guideway, such as during loss of communication with the centralized or de-centralized control system, the VOBC is able to determine a limit of movement authority (LMA) to the extent that the fusion sensor arrangement is capable of detecting objects. The VOBC is capable of automatically controlling the braking and acceleration system of the guideway mounted vehicle in order to control the speed of the guideway mounted vehicle to be at or below the maximum speed. In some embodiments, operation 304 is omitted if the VOBC is able to communicate with the centralized or de-centralized control system and is able to receive LMA instructions through the control system. The centralized and de-centralized control systems have information regarding the presence of objects along the guideway within an area of control of the control system. If the area of control extends beyond a line of sight of the fusion sensor arrangement, the VOBC is able to set a speed greater than the maximum speed in order for the guideway mounted vehicle to more efficiently travel along the guideway.

Data is received from at least two sensors in operation 306. The at least two sensors are similar to first sensor 110 or second sensor 120 (FIG. 10). In some embodiments, data is received by more than two sensors. At least one sensor of the at least two sensors is capable of a different type of detection from the at least another sensor of the at least two sensors. For example, one sensor is an optical sensor and the other sensor is an RFID reader. In some embodiments, at least one sensor of the at least two sensors is capable of a same type of detection as at least another sensor of the at least two sensors. For example, a redundant optical sensor is included in case a primary optical sensor fails, in some embodiments.

A field of detection of each sensor of the at least two sensors overlaps with each other. The field of detection includes an angular range in the horizontal direction and an angular range in the vertical direction. The angular range in the horizontal directions enables detection of objects along the guideway and the wayside of the guideway. The angular range in the vertical direction enables detection of objects which present a vertical blockage. The angular range in the vertical direction also enables detection of objects on a guideway above or below the guideway on which the guideway mounted vehicle is located.

In operation 308, the received data is fused together. The received data is fused together using a data fusion center, e.g., data fusion center 130 (FIG. 10). The data is fused together to provide a more comprehensive detection of objects along the guideway and the wayside of the guideway in comparison with data representing a single type of detection. In some embodiments, fusing the data includes confirming detection of an object and whether the detected object contains identifying information. In some embodiments, fusing the data includes determining a relative position, speed or heading of the detected object. In some embodiments, fusing the data together includes resolving conflicts between the received data. In some embodiments, fusing the data includes performing a plausibility check.

Resolving conflicts between the received data results is performed when data received from one sensor does not substantially match with data received by the other sensor. In some embodiments, a predetermine tolerance threshold is established for determining whether a conflict exists within the received data. The predetermined tolerance threshold helps to account for variations in the data which result from the difference in the detection type of the sensors. In some embodiments, a conflict is identified if an object is detected by one sensor but the object is not detected by the other sensor. In some embodiments, a status check of the sensor which did not identify the object is initiated. In some embodiments, a status check of the sensor which did not identify the object is initiated based on a type of object detected. For example, a thermal sensor is not expected to identify RFID transponder; therefore, a status check of the thermal sensor is not initiated, in some embodiments.

In some embodiments, conflicts between the received data related to the detected object are resolved by averaging the data received from the sensors. In some embodiments, resolving the conflict is based on a set of priority rules. In some embodiments, the priority rules give a higher priority to a certain type of sensor, e.g., a RFID reader over an optical sensor. In some embodiments, priority between sensor types is determined based on a distance between the fusion sensor arrangement and the detected object. For example, priority is given to the RADAR sensor if the distance between the fusion sensor arrangement and the detected object is greater than 100 meters (m) and priority is given to the optical sensor if the distance is 100 m or less.

Performing the plausibility check includes evaluating a relative change in the location of the object with respect to time. If the relative change in location exceeds a threshold value the object is determined to be implausible. When an implausible determination is made with respect to one sensor, data received from the other sensor is determined to be more reliable. In some embodiments, a status check of a sensor which provides implausible information is initiated. In some embodiments, a status check of a sensor which provides implausible information multiple times within a predetermined time period is initiated.

In optional operation 309, a status check of at least one sensor is initiated. In some embodiments, the status check is initiated as a result of a conflict between the received data. In some embodiments, the status check is initiated as a result of receiving implausible data. In some embodiments, the status check is initiated periodically to determine a health of a sensor prior to a conflict or receipt of implausible data. In some embodiments, periodic status checks are suspended while communication with the centralized or de-centralized control system is lost unless a conflict or implausible data is received.

In some embodiments, the VOBC receives the fused data and operates in conjunction with the centralized or de-centralized control to operate the guideway mounted vehicle. The VOBC receives LMA instructions from the centralized or de-centralized control. The LMA instructions are based on data collected with respect to objects, including other guideway mounted vehicles, within an area of control for the centralized or de-centralized control system. Based on the received LMA instructions, the VOBC will control the acceleration and braking system of the guideway mounted vehicle in order to move the guideway mounted vehicle along the guideway.

The VOBC receives the fused data from the fusion sensor arrangement and determines a speed and a location of the guideway mounted vehicle based on the detected objects. For example, a sign or post containing a unique identification is usable to determine a location of the guideway mounted vehicle. In some embodiments, the VOBC includes a guideway database which includes a map of the guideway and a location of stationary objects associated with unique identification information. In some embodiments, the VOBC is configured to update the guideway database to include movable objects based on information received from the centralized or de-centralized control system. By comparing the fused data with respect to an identifiable object with the guideway database, the VOBC is able to determine the location of the guideway mounted vehicle. In some embodiments, the VOBC determines a speed of the guideway mounted vehicle based on a change in location of an object detected in the fused data. The VOBC transmits the determined location and speed of the guideway mounted vehicle to the centralized or de-centralized control system.

In some embodiments, if communication with the centralized or de-centralized control system is lost, the VOBC performs autonomous operations 310. In operation 312, the VOBC identifies a detected object based on the fused data. In some embodiments, the VOBC identifies the detected object by comparing the fused data with information stored in the guideway database.

In some embodiments, the VOBC uses the identified object to determine a location of the guideway mounted vehicle in operation 314. In some embodiments, the VOBC determines the location of the guideway mounted vehicle based on unique identification information associated with the detected object. In some embodiments, the VOBC compares the unique identification information with the guideway database to determine the location of the guideway mounted vehicle.

The identified object is tracked in operation 316. Tracking the object means that a location and relative speed of the object are regularly determined in a time domain. In some embodiments, the object is tracked to determine whether the object will be on the guideway at a same location as the guideway mounted vehicle. In some embodiments, the object is tracked in order to provide location information for a non-communicating guideway mounted vehicle. In some embodiments, the location and relative speed of the object are determined periodically, e.g., having an interval ranging from 1 second to 15 minutes. In some embodiments, the location and relative speed of the object are determined continuously.

In operation 318, the VOBC provides instructions for the guideway mounted vehicle to proceed to a stopping location. In some embodiments, the stopping location includes a destination of the guideway mounted vehicle, a switch, a detected object on the guideway, coupling/de-coupling location, a protection area of a non-communicating guideway mounted vehicle or another suitable stopping location. A non-communicating guideway mounted vehicle is a vehicle which is traveling along the guideway which is under only manual operation, is experiencing a communication failure, lacks communication equipment or other similar vehicles. The VOBC autonomously generates instructions including LMA instructions. The LMA instructions are executed based on signals transmitted to the acceleration and braking system. In some embodiments, the LMA instructions are based on the location of the guideway mounted vehicle determined in operation 314 and the guideway database.

In some embodiments where the stopping location is a destination of the guideway mounted vehicle, the LMA instructions generated by the VOBC enable the guideway mounted vehicle to travel to a platform, station, depot or other location where the guideway mounted vehicle is intended to stop. In some embodiments, the VOBC controls the acceleration and braking system to maintain the guideway mounted vehicle at the destination until communication is re-established with the centralized or de-centralized control system or until a driver arrives to manually operate the guideway mounted vehicle.

In some embodiments where the stopping location is a switch, the LMA instructions generated by the VOBC cause the guideway mounted vehicle to stop at a heel of the switch if the switch is in a disturbed state. In some embodiments, the LMA instructions cause the guideway mounted vehicle to stop if the fused data fails to identify a state of the switch. In some embodiments, the LMA instructions cause the guideway mounted vehicle to stop if the fused data indicates a conflict regarding a state of the switch. In some embodiments, the LMA instructions cause the guideway mounted vehicle to stop if the most recent information received from the centralized or de-centralized control system indicated the switch is reserved for another guideway mounted vehicle.

In some embodiments where the stopping location is an object detected on the guideway, the LMA instructions generated by the VOBC cause the guideway mounted vehicle to stop a predetermined distance prior to reaching the detected object. In some embodiments, the object is a person, a disturbed switch, debris or another object along the guideway. In some embodiments, the VOBC uses the fused data to predict whether a detected object will be on the guideway when the guideway mounted vehicle reaches the location of the object. In some embodiments, the LMA instructions cause the guideway mounted vehicle to stop the predetermined distance prior to the object if the object is predicted to be on the guideway at the time the guideway mounted vehicle reaches the location of the object.

In some embodiments where the stopping location is a coupling/uncoupling location, the LMA instructions generated by the VOBC cause the guideway mounted vehicle to stop at the coupling/de-coupling location. The fused data is used to determine a distance between the guideway mounted vehicle and the other vehicle to be coupled/de-coupled. The VOBC is used to control the speed of the guideway mounted vehicle such that the coupling/de-coupling is achieved without undue force on a coupling joint of the guideway mounted vehicle. In some embodiments, the VOBC brings the guideway mounted vehicle to a stop while a separation distance between the two guideway mounted vehicles is less than a predetermined distance.

In some embodiments, where the stopping location is the protection area of a non-communicating guideway mounted vehicle, the LMA instructions generated by the VOBC stop the guideway mounted vehicle prior to entering the protection area. The protection area is a zone around the non-communicating guideway mounted vehicle to enable movement of the non-communicating guideway mounted vehicle with minimal interference with other guideway mounted vehicles. The protection area is defined by the centralized or de-centralized control system. In some embodiments, the LMA instructions cause the guideway mounted vehicle to stop prior to entering the protection area based on the most recent received information from the centralized or de-centralized control system.

One of ordinary skill in the art would recognize that additional stopping location and control processes are within the scope of this description.

In some embodiments, the VOBC continues movement of the guideway mounted vehicle along the guideway, in operation 320. The continued movement is based on a lack of a stopping location. In some embodiments, the VOBC controls reduction of the speed of the guideway mounted vehicle if a switch is traversed. The reduced speed is a switch traversal speed. The switch traversal speed is less than the maximum speed from operation 304. In some embodiments, operation 320 is continued until a stopping location is reached, communication is re-established with the centralized or de-centralized control system or a manual operator arrives to control the guideway mounted vehicle.

In some embodiments, following fusing of the received data in operation 308, LMA instructions are generated using remote driver operations 330. In operation 340, the fused data is transmitted to the remote driver, i.e., an operator who is not on-board the guideway mounted vehicle. In some embodiments, fused data is transmitted using the centralized or de-centralized control system. In some embodiments, the fused data is transmitted using a back-up communication system such as an inductive loop communication system, a radio communication system, a microwave communication system, or another suitable communication system. In some embodiments, the fused data is transmitted as an image. In some embodiments, the fused data is transmitted as alpha-numerical information. In some embodiments, the fused data is transmitted in an encrypted format.

In operation 342, the VOBC receives instructions from the remote driver. In some embodiments, the VOBC receives instructions along a same communication system used to transmit the fused data. In some embodiments, the VOBC receives the instructions along a different communication system from that used to transmit the fused data. In some embodiments, the instructions include LMA instructions, speed instructions, instructions to traverse a switch, or other suitable instructions.

The VOBC implements permissible instructions in operation 344. In some embodiments, permissible instructions are instructions which do not conflict with the maximum speed set in operation 304, a switch traversal speed, traversing a disturbed switch, traversing a portion of the guideway where an object is detected or other suitable conflicts. In some embodiments, if the speed instructions from the remote driver exceed the maximum speed, the VOBC controls the guideway mounted vehicle to travel at the maximum speed. In some embodiments, if the speed instructions from the remote driver exceed the switch traversal speed, the VOBC controls the guideway mounted vehicle to travel at the switch traversal speed. In some embodiments, the VOBC controls the guideway mounted vehicle to traverse a switch which the fused data indicates as disturbed (or a conflict exists regarding the state of the switch) if the VOBC receives LMA instructions from the remote driver to traverse the switch. In some embodiments, the VOBC controls the guideway mounted vehicle to stop if the LMA instructions from the remote driver include traversing a portion of the guideway which includes a detected object.

One of ordinary skill in the art would recognize that an order of operations of method 300 is adjustable. One of ordinary skill in the art would also recognize that additional operations are includable in method 300, and that operations are able to be omitted form operation 300.

Figure 14:
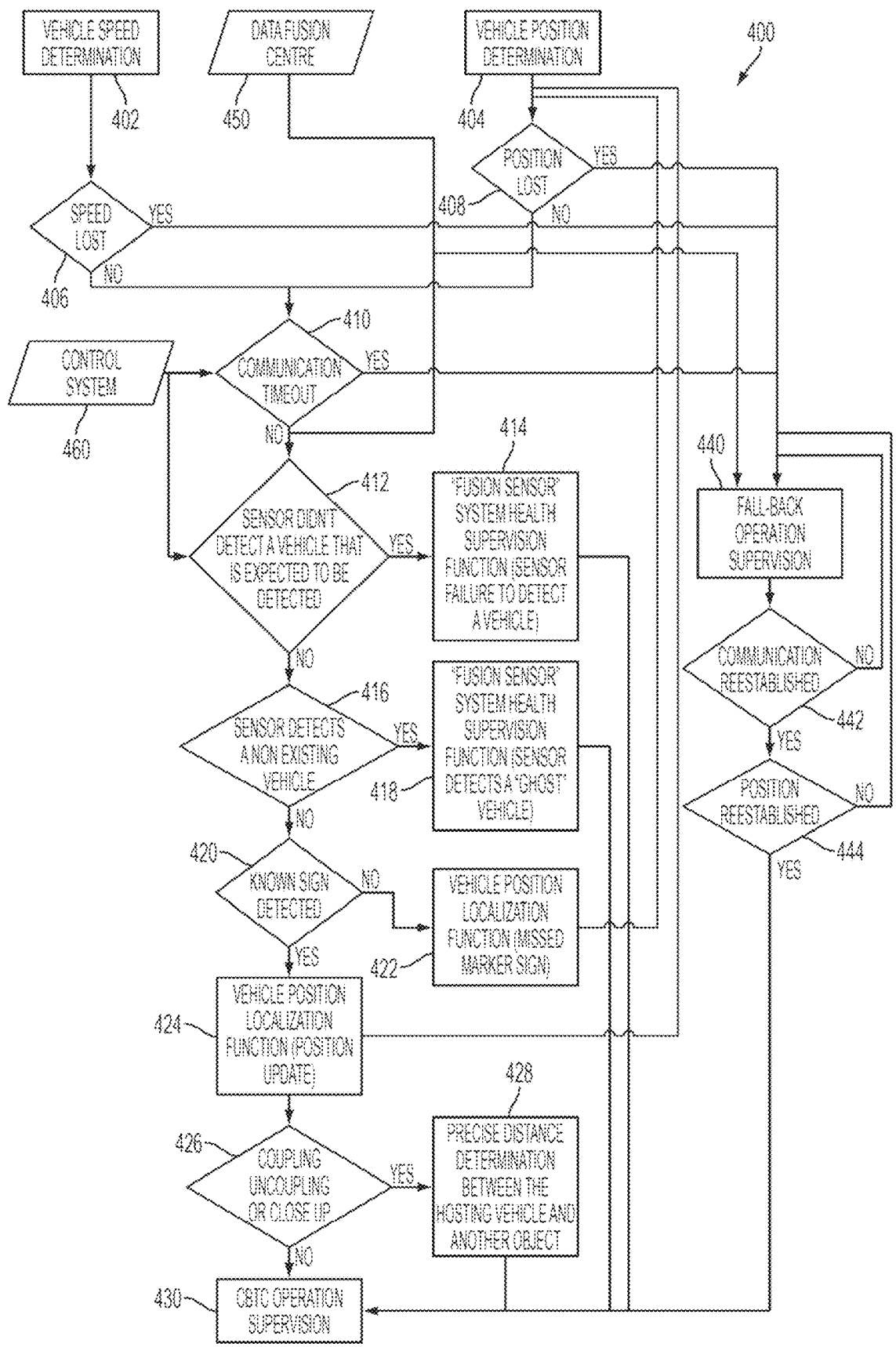
FIG. 14 is a functional flow chart for a method of determining a status of a fusion sensor arrangement in accordance with one or more embodiments.

FIG. 14 is a functional flow chart of a method 400 of determining a status of a fusion sensor arrangement in accordance with one or more embodiments. In some embodiments, method 400 is performed if operation 309 of method 300 (FIG. 13) is performed. In some embodiments, a VOBC causes method 400 to be executed periodically. In some embodiments, a data fusion center, e.g., data fusion center 130 (FIG. 10), causes method 400 to be executed upon determination of implausible data or upon receipt of conflicting data.

In operation 402, the VOBC determines a speed of the guideway mounted vehicle. In some embodiments, the VOBC determines the speed of the guideway based on information received from the centralized or de-centralized control system, information received from a data fusion center, e.g., data fusion center 130 (FIG. 10), measures taken from the guideway mounted vehicle (such as wheel revolutions per minute), or other suitable information sources. In some embodiments, the VOBC transmits the speed of the guideway mounted vehicle to the centralized or de-centralized control system.

In operation 404, the VOBC determines a position of the guideway mounted vehicle. In some embodiments, the VOBC determines the position of the guideway based on information received from the centralized or de-centralized control system, information received from a data fusion center, e.g., data fusion center 130 (FIG. 10), wayside transponders, or other suitable information sources. In some embodiments, the VOBC transmits the position of the guideway mounted vehicle to the centralized or de-centralized control system.

In operation 406, the VOBC determines whether the speed information is lost. In some embodiments, the speed information is lost due to failure of a communication system, failure of the data fusion center, an error within the VOBC or failure of another system.

In operation 408, the VOBC determines whether the position information is lost. In some embodiments, the speed information is lost due to failure of a communication system, failure of the data fusion center, an error within the VOBC or failure of another system.

If both of the speed information and the position information are still available, the VOBC determines if communication has timed out with the centralized or de-centralized control system, in operation 410. In some embodiments, the VOBC determines if communication has timed out by transmitting a test signal and determining whether a return signal is received. In some embodiments, the VOBC determines if communication has timed out base on an elapsed time since a last received communication. In some embodiments, the VOBC determines whether communication has timed out based whether an update to the guideway database was received from a control system 460.

If communication has not timed out, the VOBC determines whether a sensor of the fusion sensor arrangement did not detect a train that was expected to be detected in operation 412. The VOBC receives sensor information from data fusion center 450 and guideway database information from control system 460. Based on the guideway database information, the VOBC determines whether another guideway mounted vehicle is located at a position where the sensor of the fusion sensor arrangement should detect the other guideway mounted vehicle. Using the sensor information from data fusion center 450, the VOBC determines whether the other guideway mounted vehicle was detected. If a guideway mounted vehicle was available for detection and the sensor did not detect the guideway mounted vehicle, method 400 continues to operation 414.

In operation 414, the sensor of the fusion sensor arrangement is determined to be faulty. The VOBC provides instructions to data fusion center 450 to no longer rely on the faulty sensor. In some embodiments which include only two sensors in the fusion sensor arrangement, the VOBC ceases to rely on information provided by the fusion sensor arrangement. In some embodiments, the VOBC transmits a signal indicating a reason for determining the sensor as being faulty. In operation 414, the VOBC transmits a signal indicating the sensor failed to detect a guideway mounted vehicle, in some embodiments.

If no guideway mounted vehicle was available for detection or the sensor did detect a guideway mounted vehicle in operation 412, method 400 continues with operation 416. In operation 416, the VOBC determines whether the sensor detected a non-existing guideway mounted vehicle. Based on the guideway database information received from control system 460 and sensor information from data fusion center 450, the VOBC determines whether the sensor detected a guideway mounted vehicle where no guideway mounted vehicle is located. If a guideway mounted vehicle was detected, but the guideway dataset information indicates no guideway mounted vehicle was present, method 400 continues with operation 418.

In operation 418, the sensor of the fusion sensor arrangement is determined to be faulty. The VOBC provides instructions to data fusion center 450 to no longer rely on the faulty sensor. In some embodiments which include only two sensors in the fusion sensor arrangement, the VOBC ceases to rely on information provided by the fusion sensor arrangement. In some embodiments, the VOBC transmits a signal indicating a reason for determining the sensor as being faulty. In operation 418, the VOBC transmits a signal indicating the sensor detected a non-existent guideway mounted vehicle, in some embodiments.

If no guideway mounted vehicle was available for detection and the sensor did not detect a guideway mounted vehicle in operation 416, method 400 continues with operation 420. In operation 420, the VOBC determines whether the sensor detected a known wayside mounted object. Based on the guideway database information received from control system 460 and sensor information from data fusion center 450, the VOBC determines whether the sensor detected a wayside mounted object where a known wayside mounted object is located. If a known wayside mounted object was not detected, method 400 continues with operation 422.

In operation 422, the sensor of the fusion sensor arrangement is determined to be faulty. The VOBC provides instructions to data fusion center 450 to no longer rely on the faulty sensor. In some embodiments which include only two sensors in the fusion sensor arrangement, the VOBC ceases to rely on information provided by the fusion sensor arrangement. In some embodiments, the VOBC transmits a signal indicating a reason for determining the sensor as being faulty. In operation 422, the VOBC transmits a signal indicating the sensor failed to detect a known wayside mounted object, in some embodiments.

If the known wayside mounted object was detected in operation 420, method 400 continues with operation 424. In operation 424, the VOBC determines a location of the wayside mounted vehicle and transmits the determined location to control system 460 to update a location of the wayside mounted vehicle in the control system. In some embodiments, operation 424 is performed following operation 404. In some embodiments, operation 424 is performed every time a new location of the guideway mounted vehicle is determined.

In operation 426, the VOBC determines whether the guideway mounted vehicle is involved in a coupling/de-coupling process. The VOBC determines whether the guideway mounted vehicle is involved in the coupling/de-coupling process based on the sensor information from fusion data center 450 and the guideway database information from control system 460. The VOBC determines whether another guideway mounted vehicle is located within a coupling proximity to the guideway mounted vehicle. If the VOBC determines that the guideway mounted vehicle is involved in a coupling/de-coupling process, method 400 continues with operation 428.

In operation 428, the VOBC determine a precise distance between the guideway mounted vehicle and the other guideway mounted vehicle. The VOBC uses the senor information and the guideway database information to determine the precise distance. In some embodiments, the VOBC sends instructions to data fusion center 450 to increase resolution of the sensor information. In some embodiments, the VOBC sends instructions to the acceleration and braking system to reduce the speed of the guideway mounted vehicle so that the location of the guideway mounted vehicle has a decreased rate of change. In some embodiment, the VOBC request more frequent update of the guideway database information from control system 460 to better determine a relative position of the other guideway mounted vehicle.

If the VOBC determines the guideway mounted vehicle is not involved in a coupling/de-coupling process, method 400 continues with operation 430. In operation 430, the VOBC continues to operate the guideway mounted vehicle in coordination with control system 460. In some embodiments, the VOBC uses the sensor information from data fusion center 450 in conjunction with information from control system 460. In some embodiments, the VOBC does not rely on the sensor information from data fusion center 450 in operation 430.

Returning to operations 406, 408 and 410, if the speed of the guideway mounted vehicle or the location of the guideway mounted vehicle is lost, or if communication with control system 460 has timed out, method 400 continues with operation 440. In operation 440, the VOBC relies on a fallback operation supervision to operate the guideway mounted vehicle. In some embodiments, the VOBC relies on sensor information from data fusion center 450 to operate the guideway mounted vehicle. In some embodiments, the VOBC performs in a manner similar to method 300 (FIG. 13) to operate the guideway mounted vehicle.

In operation 442, the VOBC determines whether communication with control system 460 is re-established. If communication with control system 460 is re-established, method 400 continues with operation 444. If communication with control system 460 is no re-established, method 400 returns to operation 440.

In operation 444, the VOBC determines whether the location of the guideway mounted vehicle is re-established. If the location of the guideway mounted vehicle is re-established, method 400 continues with operation 430. If the location of the guideway mounted vehicle is not re-established, method 400 returns to operation 440.

Figure 15:
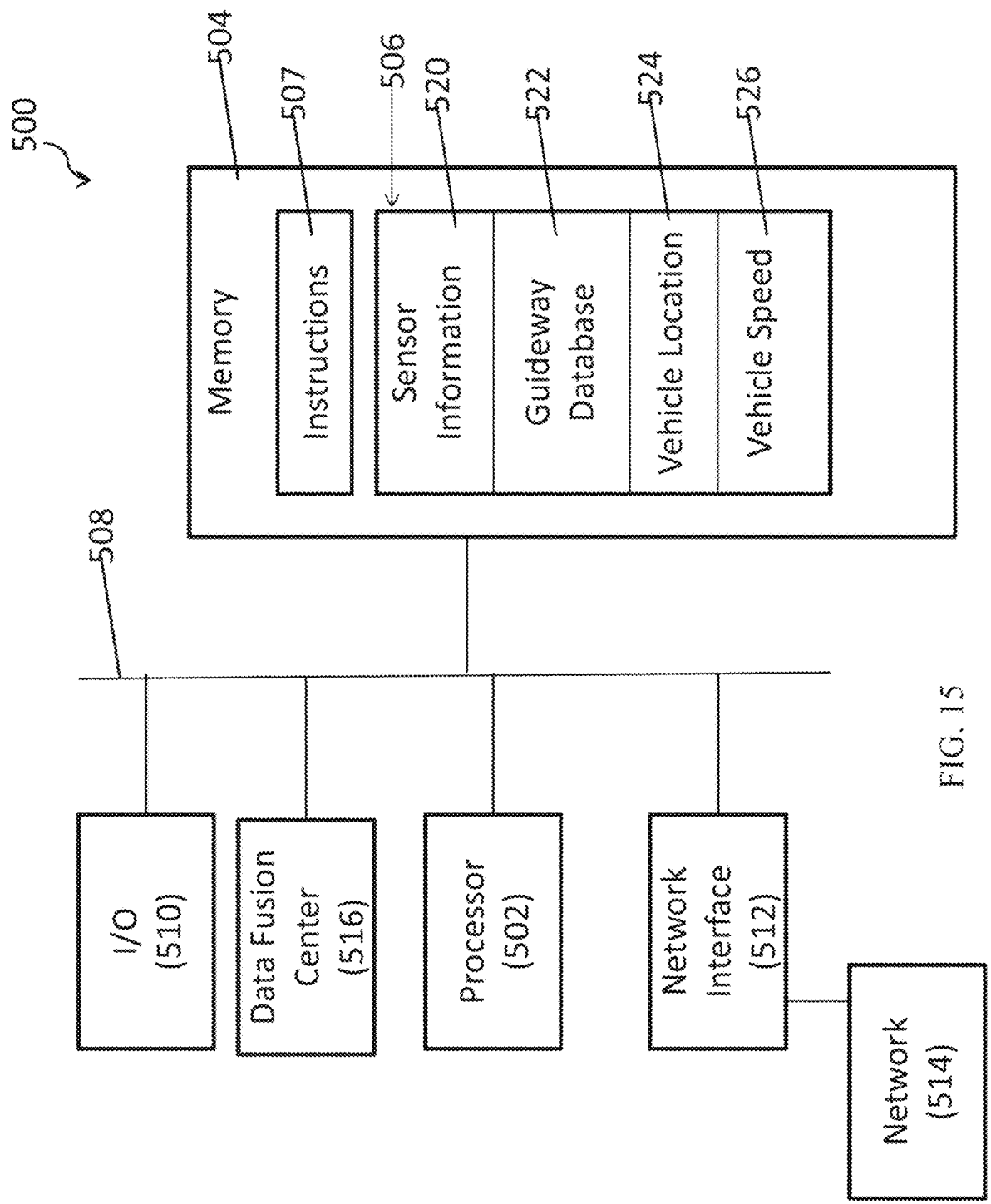
FIG. 15 is a block diagram of a vital on-board controller (VOBC) for using a fusion sensor arrangement in accordance with one or more embodiments.

FIG. 15 is a block diagram of a VOBC 500 for using a fusion sensor arrangement in accordance with one or more embodiments. VOBC 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with manufacturing machines for producing the memory array. The processor 502 is electrically coupled to the computer readable storage medium 504 via a bus 508. The processor 502 is also electrically coupled to an I/O interface 510 by bus 508. A network interface 512 is also electrically connected to the processor 502 via bus 508. Network interface 512 is connected to a network 514, so that processor 502 and computer readable storage medium 504 are capable of connecting to external elements via network 514. VOBC 500 further includes data fusion center 516. The processor 502 is connected to data fusion center 516 via bus 508. The processor 502 is configured to execute the computer program code 506 encoded in the computer readable storage medium 504 in order to cause system 500 to be usable for performing a portion or all of the operations as described in method 300 or method 400.

In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 504 stores the computer program code 506 configured to cause system 500 to perform method 300 or method 400. In some embodiments, the storage medium 504 also stores information needed for performing a method 300 or 400 as well as information generated during performing the method 300 or 400, such as a sensor information parameter 520, a guideway database parameter 522, a vehicle location parameter 524, a vehicle speed parameter 526 and/or a set of executable instructions to perform the operation of method 300 or 400.

In some embodiments, the storage medium 504 stores instructions 507 for interfacing with manufacturing machines. The instructions 507 enable processor 502 to generate manufacturing instructions readable by the manufacturing machines to effectively implement method 400 during a manufacturing process.

VOBC 500 includes I/O interface 510. I/O interface 510 is coupled to external circuitry. In some embodiments, I/O interface 510 includes a keyboard, keypad, mouse, trackball, trackpad, and/or cursor direction keys for communicating information and commands to processor 502.

VOBC 500 also includes network interface 512 coupled to the processor 502. Network interface 512 allows VOBC 500 to communicate with network 514, to which one or more other computer systems are connected. Network interface 512 includes wireless network interfaces such as BLUETOOTH, WIFI, WIMAX, GPRS, or WCDMA; or wired network interface such as ETHERNET, USB, or IEEE-1394. In some embodiments, method 300 or 400 is implemented in two or more VOBCs 500, and information such as memory type, memory array layout, I/O voltage, I/O pin location and charge pump are exchanged between different VOBCs 500 via network 514.

VOBC further includes data fusion center 516. Data fusion center 516 is similar to data fusion center 130 (FIG. 10). In the embodiment of VOBC 500, data fusion center 516 is integrated with VOBC 500. In some embodiments, the data fusion center is separate from VOBC 500 and connects to the VOBC through I/O interface 510 or network interface 512.

VOBC 500 is configured to receive sensor information related to a fusion sensor arrangement, e.g., fusion sensor arrangement 100 (FIG. 10), through data fusion center 516. The information is stored in computer readable medium 504 as sensor information parameter 520. VOBC 500 is configured to receive information related to the guideway database through I/O interface 510 or network interface 512. The information is stored in computer readable medium 504 as guideway database parameter 522. VOBC 500 is configured to receive information related to vehicle location through I/O interface 510, network interface 512 or data fusion center 516. The information is stored in computer readable medium 504 as vehicle location parameter 524. VOBC 500 is configured to receive information related to vehicle speed through I/O interface 510, network interface 512 or data fusion center 516. The information is stored in computer readable medium 504 as vehicle speed parameter 526.

During operation, processor 502 executes a set of instructions to determine the location and speed of the guideway mounted vehicle, which are used to update vehicle location parameter 524 and vehicle speed parameter 526. Processor 502 is further configured to receive LMA instructions and speed instructions from a centralized or de-centralized control system, e.g., control system 460. Processor 502 determines whether the received instructions are in conflict with the sensor information. Processor 502 is configured to generate instructions for controlling an acceleration and braking system of the guideway mounted vehicle to control travel along the guideway.

Figure 16:
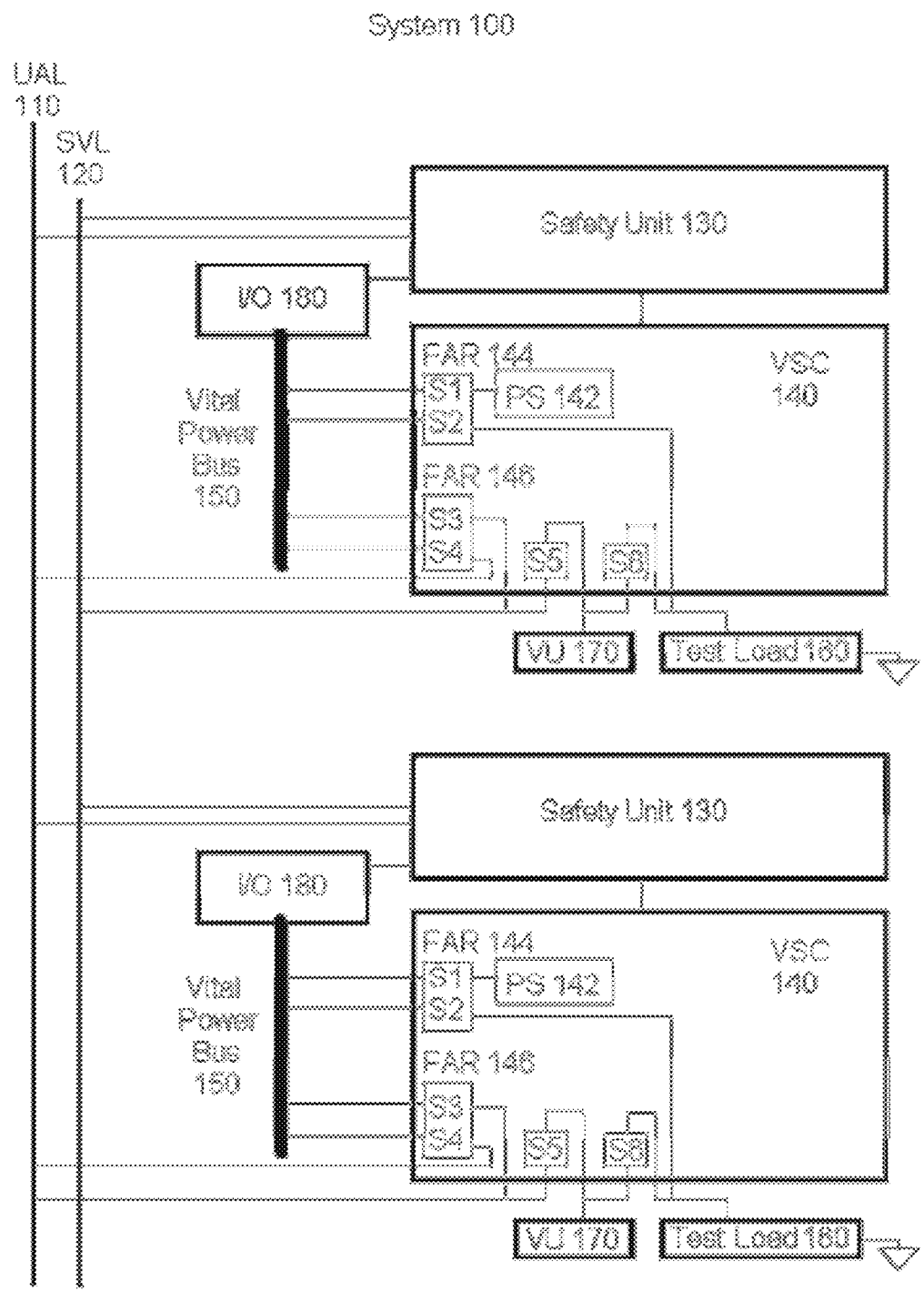
FIG. 16 is a schematic drawing of a safety system having multiple redundant safety units, in some embodiments, showing a plurality of safety units linked by two status lines.

Unless otherwise noted, reference characters hereinbelow refer to FIGS. 16-18. Referring to FIG. 16, safety assurance system 100 comprises a unit active line (UAL) 110, a safety verification line (SVL) 120, at least two safety units 130 linked to UAL 110 and SVL 120, each safety unit 130 associated with a vital system controller (VSC) 140 and a vital power bus 150.

UAL 110 is a hardware component or assembly configured as a path for communicating a status indication between multiple safety units. In some embodiments, a status indication is an electrical signal and UAL 110 is a wire, cable, printed circuit board trace, or combination thereof. In some embodiments, a status indication is an electromagnetic signal and UAL 110 is a wired and/or wireless transmission path. In some embodiments, a status indication is an optical signal and UAL 110 is a fiber cable.

SVL 120 is a hardware component or assembly configured as a path for communicating a status indication between multiple safety units. In some embodiments, a status indication is an electrical signal and SVL 120 is a wire, cable, printed circuit board trace, or combination thereof. In some embodiments, a status indication is an electromagnetic signal and SVL 120 is a wired and/or wireless transmission path. In some embodiments, a status indication is an optical signal and SVL 120 is a fiber cable.

In some embodiments, UAL 110 and SVL 120 are essentially identical hardware components or assemblies. In some embodiments, UAL 110 and SVL 120 are differing hardware components or assemblies.

Safety unit 130 is a processor-based unit capable of controlling a multiple redundant system. In some embodiments, safety unit 130 is a computing device. Safety unit 130 is configured to function either as an active/master (A/M)

unit while initiating or maintaining system control or as a passive/slave (P/S) unit while not initiating or maintaining system control. In use, safety unit 130 responds to a safety verification failure by terminating system control.

Figure 18:
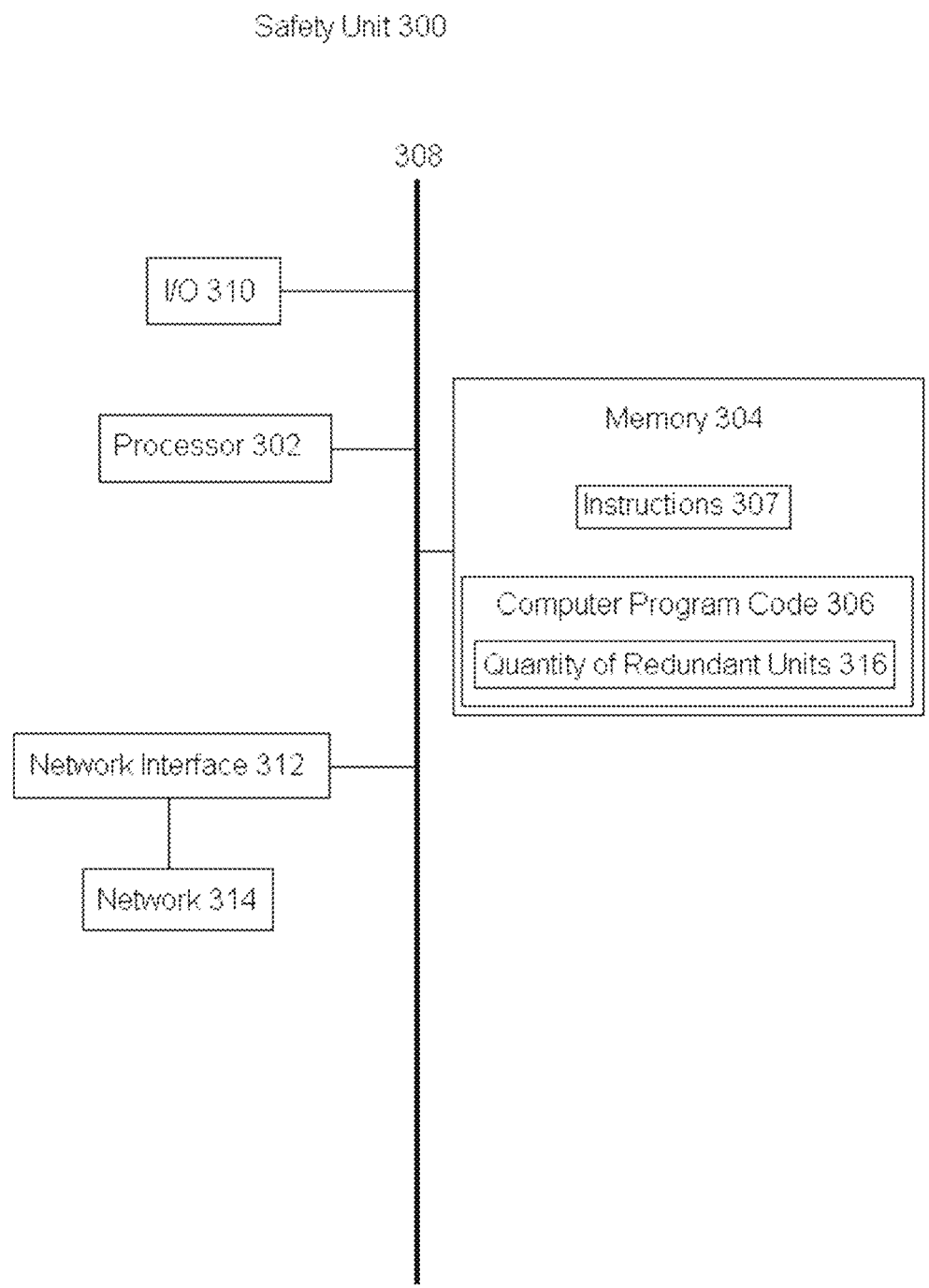
FIG. 18 is a functional block diagram of a safety unit usable for implementing a method in accordance with one or more embodiments.

In some embodiments, safety unit 130 is safety unit 300 depicted in FIG. 18. In some embodiments, all safety units 130 have identical hardware configurations. In some embodiments, safety units 130 have differing hardware configurations but are configured similarly with respect to the functions described for the various embodiments.

Safety unit 130 is configured to determine the status of each of UAL 110 and SVL 120. In some embodiments, safety unit 130 is configured to determine the status through an electrical connection on which sensing a voltage indicates whether or not a line is energized. In some embodiments, the electrical connection is a direct connection by wire, cable, or printed circuit board trace. In some embodiments, safety unit 130 is configured to determine the status through an indirect connection including one or more buffers or wired or wireless signaling circuits. In at least some embodiments, safety unit 130 is configured to determine the status through an electrical connection on which sensing a current indicates whether or not a line is energized.

Safety unit 130 is configured to determine the status of vital power bus 150. In some embodiments, safety unit 130 is configured to determine the status through an electrical connection on which sensing a voltage indicates whether or not a line is energized. In some embodiments, safety unit 130 is configured to determine the status through an electrical connection on which sensing a current indicates whether or not a line is energized. In some embodiments, the electrical connection is a direct connection by wire, cable, or printed circuit board trace. In some embodiments, safety unit 130 is configured to determine the status through an indirect connection including one or more buffers or wired or wireless signaling circuits.

Vital supervision card (VSC) 140 is a device that comprises an input configured to receive one or more electronic signals, a logic component configured to analyze the one or more signals and generate one or more control signals, an output configured to send the one or more control signals, and one or more relays or other controllable switching connections. The logic component can be a combination of hardware or hardware and software. The input and output can be an interface capable of receiving and sending one or more electronic signals.

In use, VSC 140 receives at least one input signal and, in response, the logic component causes the one or more control signals to be generated. In the case in which all input signals are received as expected, the logic component causes vital power bus 150 to be energized.

In some embodiments, vital power bus 150 is energized by power supply 142 on VSC 140. In some embodiments, vital power bus 150 is energized by a separate power supply. In some embodiments, VSC 140 control signals are used to control switchable connection S1 on VSC 140 to energize vital power bus 150. In some embodiments, VSC 140 control signals are output to one or more external switchable connections to energize vital power bus 150.

A switchable connection is a solid state or mechanical device capable of opening and closing a signal path in response to a control signal. In some embodiments, a switchable connection is a contact on a relay. In some embodiments, a switchable connection is one of two contacts in a single relay. In some embodiments, the single relay is a force activated relay (FAR) that, by design, prevents both front and rear (energized and de-energized) contacts from being closed simultaneously, thereby ensuring antivalent (mutually exclusive) operation.

Safety unit 130 is configured to communicate with and control VSC 140 by outputting electronic signals received by VSC 140. Safety unit 130 is configured to control switchable connections between vital power bus 150 and each of UAL 110 and SVL 120.

In some embodiments, switchable connection S4 on VSC 140 is configured to connect vital power bus 150 to UAL 110. In some embodiments, an external switchable connection under the control of safety unit 130 is configured to connect vital power bus 150 to UAL 110.

In some embodiments, switchable connection S3 on VSC 140 is configured to connect vital power bus 150 to SVL 120. In some embodiments, an external switchable connection under the control of safety unit 130 is configured to connect vital power bus 150 to SVL 120.

In some embodiments, switchable connection S3 and switchable connection S4 are configured for antivalent operation. In some embodiments, switchable connection S3 and switchable connection S4 are antivalent contacts of FAR 146 on VSC 140. In some embodiments, switchable connection S3 and switchable connection S4 are antivalent contacts of FAR 146 on VSC 140 in which switchable connection S3 is normally open and switchable connection S4 is normally closed. In use, antivalent operation of switchable connection S3 and switchable connection S4 ensures that vital power bus 150 is connected to either UAL 110 or SVL 120, but not to both UAL 110 and SVL 120 simultaneously. This configuration is verified by the safety unit 130.

In some embodiments, S3 and S4 are configured so that S3 is closed and S4 is open when VSC 140 is in a powered down state. In use, this configuration ensures that a de-energized vital power bus 150 is normally connected to SVL 120.

In some embodiments, in use, this configuration enables a safety unit 130 to verify that no other units are attempting to assert control or malfunctioning in such a way that another unit's vital power bus becomes energized. In some embodiments, in use, this verification is based on an expected state of a sole active/master unit 130 having an energized vital power bus 150 connected to UAL 110 through switchable connection S4 and each passive/slave unit 130 having a de-energized vital power bus 150 connected to SVL 120 through switchable connection S3. In use, verification of an expected state provides assurance of safe control while any deviation from an expected state indicates a potential safety issue. In various embodiments, in use, further assurance is provided by the additional features described below.

In some embodiments, test load 160 is a passive or active component capable of being detected or measured by a signal. In the embodiment depicted in FIG. 16, test load 160 is a two-terminal device with one terminal grounded. In some embodiments, the two-terminal device is a resistor. In some embodiments, an identical resistor is associated with each safety unit 130. In some embodiments, resistors of varying values are associated with various safety units 130.

In some embodiments, an accessible terminal of test load 160 is configured to be switchably connected to vital power bus 150. In some embodiments, the switchable connection between the accessible terminal of test load 160 and vital power bus 150 is controlled by safety unit 130. In some embodiments, switchable connection S2 on VSC 140 is configured to switchably connect the accessible terminal of test load 160 to vital power bus 150. In some embodiments, an external switchable connection under the control of safety unit 130 is configured to switchably connect the accessible terminal of test load 160 to vital power bus 150.

In some embodiments, the switchable connection between the accessible terminal of test load 160 and vital power bus 150 is antivalent to the switchable connection between the power supply and vital power bus 150. In some embodiments, in use, this antivalent operation ensures that vital power bus 150 is connected to either the power supply or the accessible terminal of test load 160, but not both the power supply and the accessible terminal of test load 160 simultaneously. In some embodiments, switchable connection S1 between power supply 142 and vital power bus 150 and switchable connection S2 between the accessible terminal of test load 160 and vital power bus 150 are contacts of FAR 144 on VSC 140. In some embodiments, switchable connection S1 between power supply 142 and vital power bus 150 and switchable connection S2 between the accessible terminal of test load 160 and vital power bus 150 are contacts of FAR 144 on VSC 140 in which switchable connection S1 is normally open and switchable connection S2 is normally closed.

In some embodiments, in use, antivalent operation of FAR 144 and FAR 146 combined with a de-energized closed state for S3 ensure that test load 160 for each de-energized VSC 140 is connected to SVL 120. In those embodiments in which test load 160 is a two-terminal, grounded test load, this configuration places test loads 160 in parallel for all de-energized VSCs 140. In those embodiments in which test load 160 is a grounded resister, this configuration places resistors in parallel for all de-energized VSCs 140.

In some embodiments, verification unit 170 is any circuit capable of verifying or measuring test load 160. In some embodiments, verification unit 170 is a current sensing circuit configured to measure resistance. In some embodiments, verification unit 170 is switchably connected to the accessible terminal of test load 160. In some embodiments the switchable connection between verification unit 170 and the accessible terminal of load 160 is controlled by safety unit 130. In some embodiments, switchable connection S6 on VSC 140 is configured to switchably connect verification unit 170 to the accessible terminal of test load 160. In some embodiments, switchable connection S6 on VSC 140 is a normally open contact of a FAR. In some embodiments, an external switchable connection under the control of safety unit 130 is configured to switchably connect verification unit 170 to the accessible terminal of test load 160.

In some embodiments, verification unit 170 is switchably connected to SVL 120. In some embodiments the switchable connection between verification unit 170 and SVL 120 is controlled by safety unit 130. In some embodiments, switchable connection S5 on VSC 140 is configured to switchably connect verification unit 170 to SVL 120. In some embodiments, switchable connection S5 on VSC 140 is a normally open contact of a FAR. In some embodiments, an external switchable connection under the control of safety unit 130 is configured to switchably connect verification unit 170 to SVL 120.

In some embodiments, in use, verification unit 170 is configured to verify test load 160 with switchable connection S2 open, switchable connection S6 closed, and switchable connection S5 open. In this configuration, in use, verification unit 170 verifies the individual test load 160 associated with safety unit 130. In some embodiments, with switchable connection S2 open, switchable connection S6 closed, and switchable connection S5 open, verification unit 170 is a current sensing circuit configured to measure resistance of resistive load 160. In this configuration, in use, the current sensing circuit measures the resistance of the individual resister associated with safety unit 130.

In some embodiments, in use, verification unit 170 is configured to verify parallel test loads 160 for all de-energized VSCs 140. With switchable connection S2 open, switchable connection S6 closed, and switchable connection S5 closed, all test loads 160 are connected to SVL 120, which is also connected to verification unit 170. In some embodiments, with switchable connection S2 open, switchable connection S6 closed, and switchable connection S5 closed, verification unit 170 is a current sensing circuit configured to measure resistance. In this configuration, the measured resistance is the parallel resistance all resisters associated with safety units 130.

In some embodiments, vital power bus 150 is configured to be electrically connected to input/output (I/O) 180 such that, in use, energizing vital power bus 150 energizes I/O 180. In some embodiments, I/O 180 is the interface between safety unit 130 and the complex under control of the redundant safety units. In use, de-energizing I/O 180 therefore disables control by safety unit 130.

The present description also concerns a method of assuring safety for a multiple redundant system. An example embodiment of a method of assuring safety for a multiple redundant system is depicted in FIG. 17. Various embodiments comprise some or all of the steps depicted in FIG. 17.

In step 210, on a safety unit, UAL status is verified. In various embodiments, verifying UAL status comprises any or all of steps 212, 214, and 216. In various embodiments, a safety unit verifies a UAL status during any or all of steps 212, 214, and 216 by sensing a UAL voltage corresponding to an energized or de-energized UAL state.

In step 212, in some embodiments, prior to initiating control, a safety unit verifies that a UAL is de-energized, thereby ensuring that no other safety unit is attempting to assert or already asserting control.

In step 214, in some embodiments, after initiating control, a safety unit verifies that a UAL is energized by the safety unit itself. In some embodiments, verifying an energized UAL is performed continuously. In some embodiments, verifying an energized UAL is performed periodically. In some embodiments, verifying an energized UAL is performed continuously but with interruptions for performing step 216 as described below.

In step 216, in some embodiments, a safety unit verifies UAL status by de-energizing and re-energizing a UAL while monitoring UAL status. In some embodiments, de-energizing and re-energizing a UAL is performed periodically. In some embodiments, de-energizing and re-energizing a UAL is performed periodically with the period based on a safety integrity level and/or failure probabilities. In some embodiments, de-energizing and re-energizing a UAL is achieved by controlling a switchable connection from a vital power bus to the UAL.

In step 220, on a safety unit, SVL status is verified. In various embodiments, verifying SVL status comprises any or all of steps 222, 224, and 226. In various embodiments, a safety unit verifies an SVL status during any or all of steps 222, 224, and 226 by sensing an SVL voltage corresponding to an energized or de-energized SVL state.

In step 222, in some embodiments, prior to initiating control, a safety unit verifies that an SVL is de-energized, thereby ensuring that no other safety unit has an energized vital power bus, i.e. no other unit is already in control.

In step 224, in some embodiments, after initiating control, a safety unit verifies that an SVL is de-energized by the safety unit. In some embodiments, verifying a de-energized SVL is performed continuously. In some embodiments, verifying a de-energized SVL is performed periodically. In some embodiments, verifying a de-energized SVL is performed continuously but with interruptions for performing step 226 as described below.

In step 226, in some embodiments, a safety unit verifies SVL status by energizing and de-energizing an SVL while monitoring SVL status. In some embodiments, energizing and de-energizing an SVL is performed periodically. In some embodiments, energizing and de-energizing an SVL is performed periodically with the period based on a safety integrity level and/or failure probabilities. In some embodiments, energizing and de-energizing an SVL is achieved by controlling a switchable connection from a vital power bus to the SVL.

In step 230, on a safety unit, an expected test load is verified. In various embodiments, verifying an expected test load comprises either or both of steps 232 and 234. In some embodiments, step 232 serves to confirm proper operation and calibrate a verification unit prior to step 234.

In step 232, a safety unit verifies a test load associated with the safety unit. In some embodiments, the test load associated with the safety unit is a resistor and verifying the test load associated with the safety unit comprises measuring the resistor with a current sensing circuit. In some embodiments, verifying a test load associated with the safety unit comprises controlling a switchable connection between a verification unit and an accessible terminal of the test load. In some embodiments, verifying a test load associated with the safety unit also verifies the disconnection of the test load from a vital power bus. In some embodiments, verifying a test load associated with the safety unit also verifies operation of the verification unit.

In step 234, a safety unit verifies a system test load. In some embodiments, a system test load is a known quantity of parallel resistors and verifying system test load comprises measuring the parallel resistors with a current sensing circuit. In some embodiments, verifying a system test load comprises controlling a switchable connection between a verification unit and an accessible terminal of the test load and a switchable connection between the verification unit and an SVL, the SVL connected to terminals of parallel test loads. In some embodiments, verifying a system test load also verifies operation of the switchable connections between an SVL and parallel test loads. In some embodiments, step 234 is performed only after successful completion of step 234.

In step 240, a safety unit controls a multiple redundant system. In various embodiments, controlling a multiple redundant system comprises any or all of steps 242, 244, and 246.

In step 242, a safety unit initiates control of a multiple redundant system. In some embodiments, initiating control of a multiple redundant system comprises initiating control of a plant or complex. In some embodiments, initiating control of a multiple redundant system comprises energizing a vital power bus. In some embodiments, initiating control of a multiple redundant system comprises disconnecting a test load from a vital power bus. In some embodiments, initiating control of a multiple redundant system comprises connecting a vital power bus to a UAL. In some embodiments, initiating control of a multiple redundant system comprises disconnecting a vital power bus from an SVL.

In step 244, a safety unit, after initiating control of a multiple redundant system, continues verification. In some embodiments, controlling a multiple redundant system comprises controlling a plant or complex. In various embodiments, continuing verification comprises any or all of steps 214, 216, 224, 226, and 230. In various embodiments, continuing verification comprises any or all of steps 214, 216, 224, 226, and 230 while controlling a plant or complex.

In step 246, a safety unit, in response to a verification failure, disables control. In various embodiments, a verification failure is any combination of failures of verification steps 210, 220, and 230. In some embodiments, disabling control comprises de-energizing I/O circuits associated with a safety unit and/or a VSC.

FIG. 18 is a block diagram of a safety unit 300 configured for safety assurance of a multiple redundant system in accordance with one or more embodiments. In some embodiments, safety unit 300 is similar to safety unit 130 (FIG. 16). Safety unit 300 includes a hardware processor 302 and a non-transitory, computer readable storage medium 304 encoded with, i.e., storing, the computer program code 306, i.e., a set of executable instructions. Computer readable storage medium 304 is also encoded with instructions 307 for interfacing with elements of safety unit 300. The processor 302 is electrically coupled to the computer readable storage medium 304 via a bus 308. The processor 302 is also electrically coupled to an I/O interface 310 by bus 308. A network interface 312 is also electrically connected to the processor 302 via bus 308. Network interface 312 is connected to a network 314, so that processor 302 and computer readable storage medium 304 are capable of connecting and communicating to external elements via network 314. In some embodiments, network interface 312 is replaced with a different communication path such as optical communication, microwave communication, inductive loop communication, or other suitable communication paths.

In some embodiments, network interface 312 is connected to I/O circuit of FIG. 16. In some embodiments, network interface 312 is connected to VSC 140 of FIG. 16.

Figure 17:
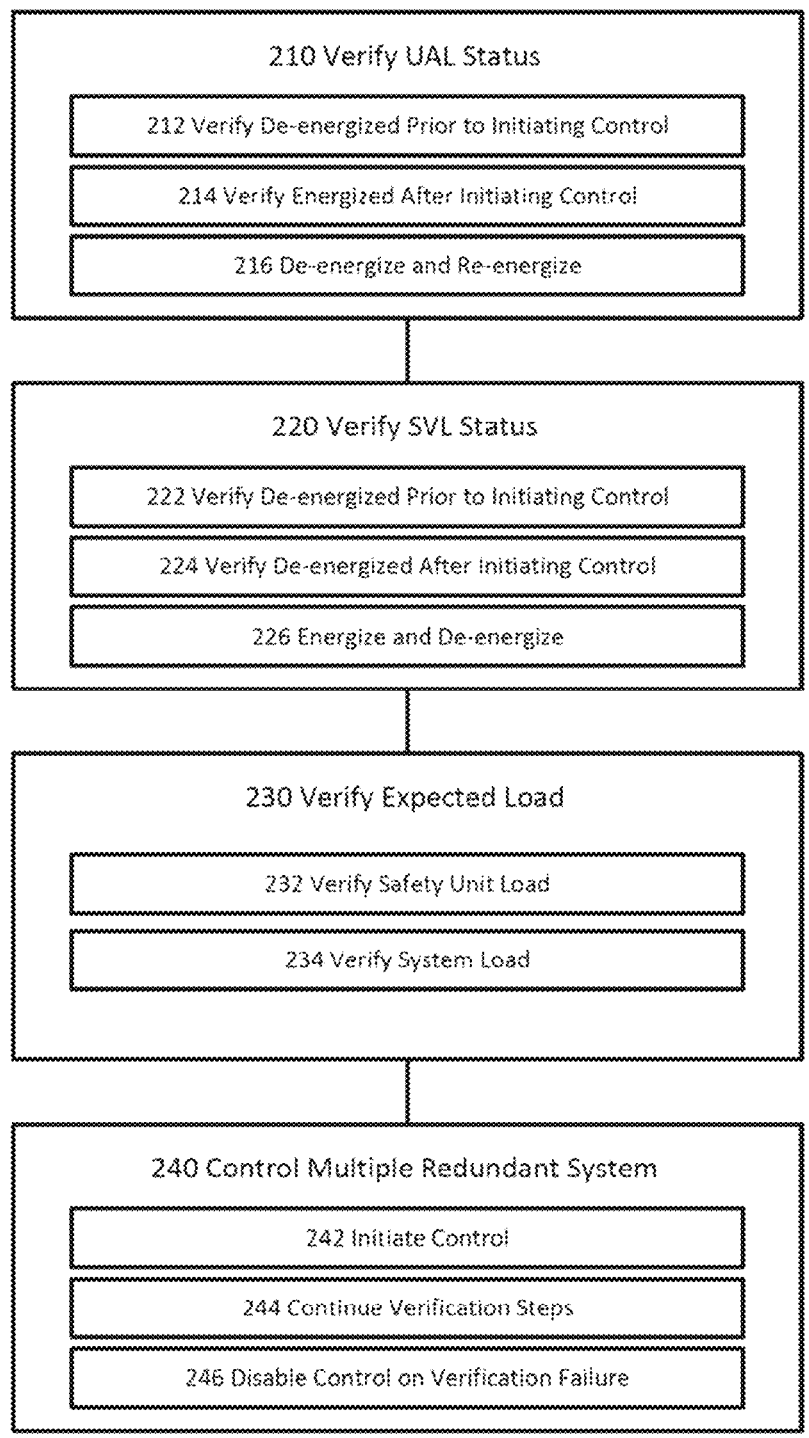
FIG. 17 is a flow chart for a method of assuring safety for a multiple redundant system, in some embodiments.

The processor 302 is configured to execute the computer program code 306 encoded in the computer readable storage medium 304 in order to cause safety unit 300 to be usable for performing a portion or all of the operations as described with respect to safety assurance system 100 (FIG. 16) or a method 200 (FIG. 17).

In some embodiments, the processor 302 is a central processing unit (CPU), a multi-processor, a distributed processing system, an application specific integrated circuit (ASIC), and/or a suitable processing unit. In some embodiments, processor 302 is configured to receive detection and loss of detection information signals and number of wheel revolutions information signals via network interface 312. In some embodiments, processor 302 is configured to generate vehicle control information signals for transmitting to external circuitry via network interface 312.

In some embodiments, the computer readable storage medium 304 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD). In some embodiments, the computer readable storage medium 404 is part of an embedded microcontroller or a system on chip (SoC).

In some embodiments, the storage medium 304 stores the computer program code 306 configured to cause safety unit 300 to perform the operations as described with respect to safety assurance system 100 (FIG. 16) or method 200 (FIG. 17). In some embodiments, the storage medium 304 also stores information needed for performing the operations as described with respect to safety assurance system 100, such as a quantity of redundant units parameter 316, and/or a set of executable instructions to perform the operation as described with respect to safety assurance system 100.

In some embodiments, the storage medium 304 stores instructions 307 for interfacing with external components. The instructions 307 enable processor 302 to generate operating instructions readable by the external components to effectively implement the operations as described with respect to dynamic wheel diameter determination system 100.

Safety unit 300 includes I/O interface 310. I/O interface 310 is coupled to external circuitry. In some embodiments, I/O interface 310 is configured to receive instructions from a port in an embedded controller.

Controller 300 also includes network interface 312 coupled to the processor 302. Network interface 312 allows safety unit 300 to communicate with network 314, to which one or more other computer systems are connected.

Network interface 312 includes wireless network interfaces such as BLUETOOTH, WIFI, WIMAX, GPRS, or WCDMA; or wired network interface such as ETHERNET, USB, IEEE-1394, or asynchronous or synchronous communications links, such as RS485, CAN or HDLC. In some embodiments, the operations as described with respect to safety unit 300 are implemented in a complex having variable numbers of redundant units, information indicative of the number of redundant units is exchanged between different safety units 300 via network 314.

Safety unit 300 is configured to receive information related to a quantity of redundant units from a user or an external circuit. The information is transferred to processor 302 via bus 308 and stored in computer readable medium 304 as quantity of redundant units parameter 316.

During operation, processor 302 executes a set of instructions to assure safety as described with respect to safety assurance system 100 (FIG. 16 or method 200 (FIG. 17)).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a first sensor on a first end of a vehicle having the first end and a second end, the first sensor being configured to generate corresponding sensor data based on a detected sign of a plurality of signs along a direction of movement of the vehicle, wherein the signs of the plurality of signs comprise a dynamic portion including one or more of a seven segments character display comprising changeable characters or a QR code display comprising a changeable pattern;
a second sensor on the second end of the vehicle, the second sensor being configured to generate corresponding sensor data based on the dynamic portion of the detected sign; and
a controller coupled with the first sensor and the second sensor, the controller being configured to:
determine a sign ID of the detected sign based on the dynamic portion of the detected sign;
determine a location of the vehicle based on the sign ID and a database comprising locations of the signs of the plurality of signs;
calculate a speed of the vehicle relative to the detected sign of the plurality of signs based on the sensor data generated by the first sensor and the second sensor; and
cause the speed of the vehicle relative to the detected sign to be output by a display.

2. The system of claim 1, wherein at least one of the first sensor or the second sensor comprises a radar detector, a LIDAR detector, a camera, or an IR detector.

3. The system of claim 1, further comprising:
a wayside control system communicatively coupled with the signs of the plurality of signs; and
at least one third sensor along the direction of movement of the vehicle, the at least one third sensor being communicatively coupled with the wayside control system and configured to detect the vehicle speed relative to the detected sign based on the vehicle speed output by the display.

4. The system of claim 3, wherein the wayside control system is configured to change the dynamic portion of the signs of the plurality of signs.

5. The system of claim 4, further comprising an exterior of the vehicle that includes the one or more of the seven segments character display comprising the changeable characters or the QR code display comprising the changeable pattern.

6. The system of claim 5, wherein
the controller is configured to change the display to indicate one or more of a vehicle ID, a switch request, a connected path information or destination information, and
the wayside control system is configured to determine the vehicle ID, the switch request, the connected path information or the destination information based on a detection of the display by the at least one third sensor.

7. The system of claim 5, wherein the at least one of third sensor comprises a radar detector, a LIDAR detector, a camera, or an IR detector.

8. A method, comprising:
detecting a sign of a plurality of signs along a direction of movement of a vehicle based on sensor data generated by a first sensor on a first end of the vehicle, wherein the signs of the plurality of signs comprise a dynamic portion including one or more of a seven segments character display comprising changeable characters or a QR code display comprising a changeable pattern;
detecting the sign of the plurality of signs along the direction of movement of the vehicle based on sensor data generated by a second sensor on a second end of the vehicle opposite the first end of the vehicle;
determining a sign ID of a detected sign based on the dynamic portion of the detected sign;
determining a location of the vehicle based on the sign ID and a database comprising locations of the signs of the plurality of signs;

calculating a speed of the vehicle relative to the detected sign of the plurality of signs based on the sensor data generated by the first sensor and the second sensor; and causing the speed of the vehicle relative to the detected sign to be output by a display.

9. The method of claim 8, wherein the display comprises one or more of a seven segments character display comprising changeable characters or a QR code display comprising a changeable pattern on an exterior of the vehicle, and the method further comprises:

changing the display to indicate one or more of a vehicle ID, a switch request, a connected path information or destination information.

10. A system, comprising:

a first sensor on a first end of a vehicle having the first end and a second end, the first sensor being configured to generate corresponding sensor data based on a detected sign of a plurality of signs along a direction of movement of the vehicle, wherein the signs of the plurality of signs comprise:

a dynamic portion including one or more of a seven segments character display comprising changeable characters or a QR code display comprising a changeable pattern; and a static portion configured to indicate information that does not change;

a second sensor on the second end of the vehicle, the second sensor being configured to generate corresponding sensor data based on the detected sign; and a controller coupled with the first sensor and the second sensor, the controller being configured to:

determine a sign ID of the detected sign based on at least one of the static portion or the dynamic portion of the detected sign;

determine a location of the vehicle based on the sign ID and a database comprising locations of the signs of the plurality of signs;

calculate a speed of the vehicle relative to the detected sign of the plurality of signs based on the sensor data generated by the first sensor and the second sensor;

cause the speed of the vehicle relative to the detected sign to be output by a display; and determine one or more of a switch attribute or an authorized speed for a guideway section along which the vehicle is configured to travel based on the dynamic portion of the detected sign, wherein the dynamic portion is changeable based on an instruction received from a wayside control system communicatively coupled with the signs of the plurality of signs.

11. The system of claim 10, further comprising:

a wayside control system communicatively coupled with the signs of the plurality of signs; and at least one third sensor along the direction of movement of the vehicle, the at least one third sensor being communicatively coupled with the wayside control system and configured to detect the vehicle speed relative to the detected sign based on the vehicle speed output by the display.

12. The system of claim 11, wherein the wayside control system is configured to change the dynamic portion of the signs of the plurality of signs.

13. The system of claim 12, wherein the seven segments character display comprises changeable characters or a QR code display comprising a changeable pattern on an exterior of the vehicle.

14. The system of claim 13, wherein the controller is configured to change the display to indicate one or more of a vehicle ID, a switch request, a connected path information or destination information, and the wayside control system is configured to determine the vehicle ID, the switch request, the connected path information or the destination information based on a detection of the display by the at least one third sensor.

15. The system of claim 14, wherein the at least one of third sensor comprises a radar detector, a LIDAR detector, a camera, or an IR detector.

16. The system of claim 10, further comprising:

at least one third sensor along the direction of movement of the vehicle, wherein the at least one third sensor is communicatively coupled with the wayside control system and configured to detect the vehicle speed relative to the detected sign based on the vehicle speed output by the display.

17. The system of claim 16, wherein the display comprises one or more of a seven segments character display comprising changeable characters or a QR code display comprising a changeable pattern on an exterior of the vehicle.

18. The system of claim 17, wherein the controller is configured to change the display to indicate one or more of a vehicle ID, a switch request, a connected path information or destination information, and the wayside control system is configured to determine the vehicle ID, the switch request, the connected path information or the destination information based on a detection of the display by the at least one third sensor.

19. The system of claim 18, wherein the at least one of third sensor comprises a radar detector, a LIDAR detector, a camera, or an IR detector.

20. The system of claim 10, wherein at least one of the first sensor or the second sensor comprises a radar detector, a LIDAR detector, a camera, or an IR detector.

* * * * *